(12) United States Patent
Nishimura et al.

(10) Patent No.: US 8,215,451 B2
(45) Date of Patent: Jul. 10, 2012

(54) IMPACT AND SOUND ABSORBING MATERIAL AND SOUND ABSORBING STRUCTURE

(75) Inventors: Yasuhiko Nishimura, Toyota (JP); Masanori Ogawa, Tokai (JP); Makoto Fujii, Tokai (JP); Naohiro Mizutani, Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 0 days.

(21) Appl. No.: 13/003,636

(22) PCT Filed: Jun. 1, 2009

(86) PCT No.: PCT/JP2009/059976
§ 371 (c)(1),
(2), (4) Date: Jan. 11, 2011

(87) PCT Pub. No.: WO2010/007834
PCT Pub. Date: Jan. 21, 2010

(65) Prior Publication Data
US 2011/0108359 A1    May 12, 2011

(30) Foreign Application Priority Data
Jul. 17, 2008 (JP) .................................. 2008-185844

(51) Int. Cl.
*E04B 1/82* (2006.01)
(52) U.S. Cl. ......... 181/290; 181/284; 181/286; 181/198
(58) Field of Classification Search .................. 181/198, 181/290, 284, 286, 292
See application file for complete search history.

(56) References Cited

U.S. PATENT DOCUMENTS

| 4,150,186 | A * | 4/1979 | Kazama | 428/140 |
| 5,415,339 | A * | 5/1995 | Howard | 229/403 |
| 7,708,847 | B2 * | 5/2010 | Sahay | 156/39 |
| 2002/0025421 | A1 | 2/2002 | Sugawara et al. | |
| 2003/0159400 | A1 * | 8/2003 | Forrester et al. | 52/783.17 |
| 2004/0055813 | A1 | 3/2004 | Tsuiki et al. | |
| 2004/0177590 | A1 * | 9/2004 | Nudo et al. | 52/783.1 |
| 2005/0263346 | A1 * | 12/2005 | Nishimura | 181/290 |
| 2006/0254204 | A1 * | 11/2006 | Swiszcz et al. | 52/793.1 |

(Continued)

FOREIGN PATENT DOCUMENTS

JP    11-161282    6/1999

(Continued)

OTHER PUBLICATIONS

International Search Report in PCT/JP2009/059976.

*Primary Examiner* — Forrest M Phillips
(74) *Attorney, Agent, or Firm* — Cooper & Dunham LLP

(57) ABSTRACT

[Subject] The subject of the present invention is to provide a shock and sound absorbing material having a light weight, and demonstrating an excellent shock and sound absorbing performance. As a method for solving the subject, the present invention provides a shock and sound absorbing material 1 comprising a porous component 2, and a surface material 3 which is laminated onto the porous component 2, wherein the surface material 3 has at least one layer made of a stretchable paper material 5. The shock and sound absorbing material 1 is installed on a cover panel 7 covering a sound source such as an engine cover, and the porous component 2 is set so as to face the cover panel 7, with the surface material 3 being set so as to face the sound source, and form a cell structure between the cover panel 7 and the surface material 3.

5 Claims, 6 Drawing Sheets

U.S. PATENT DOCUMENTS

2010/0175949 A1* 7/2010 Yamaguchi et al. .......... 181/286
2011/0100747 A1* 5/2011 Hoetzeldt et al. ............. 181/290

FOREIGN PATENT DOCUMENTS

| JP | 11-217086 | 8/1999 |
| JP | 2000-343633 | 12/2000 |
| JP | 2004-062074 | 2/2004 |
| JP | 2004-169616 | 6/2004 |
| JP | 2004-175200 | 6/2004 |
| JP | 2004-325973 | 11/2004 |
| JP | 2005-195989 | 7/2005 |
| WO | WO2004/013427 A1 | 2/2004 |

* cited by examiner though the friction between said fibers being generated by the vibration of said fiber sheet, resulting in a suitable sound absorbing characteristic of said sound absorbing material being demonstrated.

IMPACT AND SOUND ABSORBING MATERIAL AND SOUND ABSORBING STRUCTURE

FIELD OF THE INVENTION

The present invention relates to a shock and sound-absorbing material and a sound-absorbing structure for use around an automotive engine, or as the floor or head lining of a car, or to be used around a noisy device such as a compressor, or as a building material, like for a sound-proof wall or floor, or such in the case of a house, or for use as a sound-proof material to be buried under the surface of a road, or for a roadside sound-proof wall, or the like.

BACKGROUND OF THE INVENTION

Hitherto, for instance, as a sound-absorbing material to be used in a car, a sound absorbing material mainly comprising a base panel and a fiber sheet laminated on said base panel, with an intermediating air layer, has been provided (Patent Literatures 1~5). There have been other types of sound absorbing material, mainly comprising a singular thick fiber sheet (Patent Literatures 6, 7).

Patent Literature 1: Tokkai H11-161282
Patent Literature 2: Tokkai H11-217086
Patent Literature 3: Tokkai 2004-062074
Patent Literature 4: Tokkai 2004-169616
Patent Literature 5: Tokkai 2004-175200
Patent Literature 6: Tokkai 2004-325973
Patent Literature 7: Tokkai 2005-195989

DISCLOSURE OF THE INVENTION

Subjects to be Solved by the Invention

For instance, as disclosed in the sound absorbing device in said Patent Literature 1, a sound absorbing material containing an air layer has a so called cell structure in which a cell is constructed between a base panel and said sound absorbing material. In said cell structure, the sound wave from a noise source are radiated as an incident wave into said cell through said sound absorbing material, and said incident wave reaches said base panel through said air layer as it stands to be reflected by said base panel as a reflected wave, and the resulting reflected wave forms a standing wave by synthesizing with said incident wave. The resulting standing wave again reaches said sound absorbing material through said air layer. Herein, said standing wave oscillates so that the antinode between the wave crest and the wave trough in the oscillation comes to the position away from said base panel, the distance being an odd number times ¼ of the wave length ($\lambda$), and the sound energy becomes maximum at said position.

Thus, the design of said sound absorbing material dictates that in said cell structure, the height of the cell (thickness of the cell) is set to be ¼ of the wave length ($\lambda$), or an odd number times ¼ of the wave length ($\lambda$) so that said sound absorbing material can be arranged at a position at which the sound energy maximizes, making a maximum energy sound wave which will penetrate said sound absorbing material.

For instance the noise generated from the engine, which is a car's main noise source, is about 1000 $H_z$ and in this case, the wave length $\lambda$ will be 0.34 m, so that the height (thickness) of the cell will be 0.34 m/4=8.5 cm. In the case where the height (thickness) of the cell is set to be as described above, the energy of said sound wave may be damped as the wave penetrates said sound absorbing material so that the sound absorbing performance of said sound absorbing material can be effectively demonstrated. Further, in a case where said sound absorbing material is made from a fiber sheet, the energy of the sound (air vibrations) may be changed into a thermal energy through the friction between said fibers being generated by the vibration of said fiber sheet, resulting in a suitable sound absorbing characteristic of said sound absorbing material being demonstrated.

Nevertheless, in said sound absorbing material having a cell structure, it is necessary to set the thickness of said sound absorbing material so as to be about ¼ of the wave length ($\lambda$) of the sound wave, for instance, in a case where the low register sound wave from a car is the target sound wave to be absorbed, the sound absorbing material, including the cell structure having an 8.5 cm thickness may demonstrate a high silencing effectiveness, but there is a problem in that said sound absorbing material can not be arranged at a position having no space such as on the underside of the oil pan, or the upside of the headlining in a compartment, or the like.

Whereas, as in the case of a sound absorbing material made only of fiber sheet and having no cell structure, to secure the air layer, and demonstrate a suitable sound absorbing performance through only the sound absorbing characteristics of said fiber sheet, it is necessary to increase its density (or the unit weight, or the areal weight). For instance, the unit weight of the sound absorbing material of Patent Literature 6, is set to be in the range of between 300 and 1500 g/m², the unit weight of the sound absorbing material of Patent Literature 7 is set to be 1500 g/m².

As a result, since the mass of the sound absorbing material increases, there arise a serious problem as attempts to reduce the weight of the cars in recent years, so as to improve fuel efficiency, have become crucial. Further, in a case where the density of said sound absorbing material is raised excessively the vibration of said fiber sheet becomes problematic, so that the sound waves are reflected by said sound absorbing material without penetration, degrading sound absorbing performance.

Further, for instance, in a case of the shock and sound-absorbing material being set on a bonnet hood, the components of the shock and sound-absorbing material should be selected so as to continue to maintain a suitable elasticity in a completely crushed state, such as occurs when a human body accidentally bumps into the bonnet hood.

The conventional shock and sound-absorbing material, made of a soft type polyurethane foam, may reveal the hardness of the base panel in a case where said shock and sound absorbing material is completely crushed.

The Means to Solve the Problems

As the means to solve the subject, the present invention provides a shock and sound-absorbing material comprising a porous component and a surface material which is laminated onto said porous component, wherein said surface material has at least one layer made of a stretchable paper material.

Generally, said stretchable paper material is a paper material having an uneven surface. Further, said surface material includes preferably a first sound-absorbing layer arranged on said porous component, a second sound-absorbing layer laminated onto said first sound-absorbing layer, and a surface skin layer laminated onto said second sound absorbing layer, with said second sound-absorbing layer preferably being made of said stretchable paper material. Said first sound-absorbing layer and said surface skin layer are preferably made of an air-permeable porous material, and generally said porous component is a panel component made from a thermoplastic resin, having a large number of apertures to form a cell structure.

Said stretchable paper material preferably has a unit weight in the range of between 10 and 50 g/m$^2$ and an airflow resistance between of 0.06 and 3.0 kPa·s/m, with said surface material being preferably set to have an airflow resistance of between 0.4 and 5.0 kPa·s/m, and further, it is preferable—that a synthetic resin is coated onto the surface and/or backside of said stretchable paper material, so as to adjust the airflow resistance of said stretchable paper material. Concretely said stretchable paper material is a creped and/or embossed paper.

Still further, the present invention provides a sound absorbing structure, wherein said shock and sound absorbing material is installed on a cover panel covering a sound source, with said shock and sound absorbing material being arranged so that said surface material faces said sound source, and said porous component faces said cover panel.

Effectiveness of the Invention

Said shock and sound absorbing material 1 is installed on a cover panel 7 covering sound source such as an engine cover, and is arranged so that said surface material 3 faces said sound source and said porous component 2 faces said cover panel 7, creating a sound absorbing structure. In the resulting sound absorbing structure, an air layer is formed between said cover panel 7 and said surface material 3 as a sound absorbing material by said porous component 2 forming a cell structure.

The sound waves reaching said shock and sound absorbing material 1 from the noise source are radiated as an incident wave into said cell structure through said surface layer 3, with a part of said incident wave being reflected by said cover panel 7 as a reflected wave, while the other part of said incident wave will penetrate as a penetrating wave, by making said cover panel 7 co-vibrate. Further, the resulting reflected wave from said cover panel 7 synthesizes with said incident wave so as to be a standing wave, and the resulting standing wave will reach said surface layer 3, and will penetrate said surface layer 3.

Herein, to make the sound waves from the noise source effectively enter said shock and sound absorbing material 1, and further, to avoid the emission of said sound waves from said shock and sound absorbing material 1 as noise, should be seriously considered.

Said surface material 3 is made of a laminated sheet, including a first sound absorbing layer 4 arranged so as to face said porous component 2, a second sound absorbing layer 5 laminated onto said first sound absorbing layer 4, and a surface skin layer 6 laminated onto said second sound absorbing layer 5.

Said first sound absorbing layer 4 and said surface skin layer 6 are both made of an air-permeable porous material, (with the exception of said stretchable paper material), and said second sound absorbing layer 5 is made of an stretchable paper material with an uneven surface, and since said air-permeable porous material, and said stretchable paper material are both soft and light, it is possible that said stretchable paper material and air-permeable porous material both push the sound waves from the noise source effectively into said cell structure, without reflecting said sound waves.

Herein, the air flow resistance of said surface material 3 is properly elevated by the intermediation of said second sound absorbing layer 5 made of the stretchable paper material between said first sound absorbing layer 4 and said surface skin layer 6, both made of the air-permeable porous material.

Further, since said stretchable paper material has an uneven surface, an air-layer may be formed between said first sound absorbing layer 4 and surface skin layer 6. Depending on the air-layer in said surface material 3, said surface material 3 will become softer and lighter. Accordingly said surface material 3 can be more easily vibrated by sound waves from the noise generating source, giving said surface material 3 by far superior structural damping effectiveness as compared to a conventional surface material made of only an air-permeable porous material, such as a fiber sheet. As a result, when the sound waves from the noise source are radiated into the cell constructed by said porous component 2 through said surface material 3, said shock and sound absorbing material 1 of the present invention can damp said sound waves.

Still further, since said stretchable paper material has an uneven surface which forms a cell structure in said surface material 3, the sound absorbing effectiveness depending on said cell structure may be demonstrated, to elevate the sound absorbing effectiveness of said shock and sound absorbing material 1.

Accordingly, said shock and sound absorbing material of the present invention can suppress the emission of the sound waves as noise since the sound waves which have penetrated through said surface material 3 have already lost the energy to make said cover panel 7 co-vibrate. Further, the standing wave which reached said surface material 3 is absorbed effectively thereto with the excellent structural damping effect and the sound absorbing effect of said surface material 3. As a result, since the sound waves which reach said shock and sound absorbing material 1 from the noise source are effectively absorbed into said shock and sound absorbing material 1, the emission of sound waves as noise is prevented.

Moreover, since said stretchable paper material gives said surface material 3, a preferable high airflow resistance, said stretchable paper material can make the sympathetic vibration from said surface material 3 conform to a low frequency, resulting in the thickness of the cell, namely the thickness of said shock and sound absorbing material 1 being reducible.

Additionally, the airflow resistance of said stretchable paper material can be adjusted by coating a synthetic resin onto the surface and/or backside of said stretchable paper material, and further unevenness of said stretchable paper material can be also adjusted by said synthetic resin coating, so that both the airflow resistance and the areal rigidity of said stretchable paper material can be adjusted with the amount of said synthetic resin coating, and since the sympathetic vibrational frequency of fibers within said stretchable paper material can be tailored to the specified frequency of the sound waves from the subject noise source, it becomes possible to decrease the integrated noise levels effectively.

Further, if desired, said shock and sound absorbing material 1 of the present invention can be molded by such as proper bend molding to impart a predetermined shape, or the like, said stretchable paper material not obstructing the moldability of said shock and sound absorbing material 1, since said stretchable paper material, being a second sound absorbing layer 5 of said surface layer 3, can be stretched following said molding.

[Effect]

Said shock and sound absorbing material of the present invention has a light weight, and shows an excellent shock and sound absorbing property, and further said shock and sound absorbing material can be easily molded into a predetermined shape, its thickness also being reducible, so that said shock and sound absorbing material can be installed into a place into which there is no conventional space to install a shock and sound absorbing material, such as the space under the oil pan in the engine room, or the upside of the head lining in the compartment of a car, or the like.

BEST MODE FOR CARRYING OUT THE INVENTION

The present invention is described below.

FIG. 1 relates an embodiment of said shock and sound absorbing material of the present invention. In the shock and sound absorbing material 1 shown in FIG. 1 numeral 2 shows a porous component. A surface material 3 is laminated onto one side of said porous component 2. Said surface material 3 is a laminated sheet produced by laminating a layer which is made of an stretchable paper material having uneven surface, onto a layer which is made of an air-permeable porous material. Concretely, said surface material 3 is made of a laminated sheet including a first sound absorbing layer 4 made of an air-permeable porous material arranged on said porous component 2 side, a second sound absorbing layer 5 made of an stretchable paper material which is attached to the opposite side of said first sound absorbing layer 4, to the opposite side of said porous component 2 (the surface of said first sound absorbing layer 4), and a surface skin layer 6 made of an air-permeable porous material which is attached to the surface of said second sound absorbing layer 5. Said shock and sound absorbing material 1 is set to be arranged on a cover panel 7 covering a noise source, said shock and sound absorbing material 1 being installed on said cover panel 7 so that said porous component 2 faces said cover panel 7 and said surface material 3 faces the noise source. Said porous component 2 serves as a spacer, providing a cell by forming an air layer between said cover panel 7 and said surface material 3, which is a sound absorbing material.

An object to which said shock and sound absorbing material 1 is installed is, for instance, a car such as passenger car, bus, or the like, home electrical appliances such as air-conditioning equipment, refrigerator, washing machine, or the like, electrical appliances such as personal computer (PC), items relating to the civil engineering field, such as items relating to roads, like expressway, motor way, general road, tunnel, or the like, and items relating to the railway like the Shinkansen (the Bullet train), sleeping car, or the like, items relating to the construction field such as house, apartment, school, station building, reinforced building, or the like, and items relating to vessels such as ferry, boat, or the like.

In the case where a vehicle is the object, said shock and sound absorbing material 1 can be installed in or applied to the following items. Engine cover components such as engine head cover, engine under cover, or the like, car equipment cover components such as transmission cover, differential gear cover, motor cover or invertor cover equipped in hybrid or the electric cars, or the like, interior finishing materials such as head lining, door trim, floor mat or floor panel, seat, rear package tray, or the like, car exterior materials such as front hood, wind pressure cover, fender liner, or the like, exterior panels such as floor under panel, door panel, bonnet hood, trunk room hood, roof panel, or the like, with other possible objects or places being such as chassis frame, the space inside or outside of the reinforcement, intake duct, inside of surge tank, inside of exhaust pipe muffler, inside of tire housing, inside of tire, tire wheel, or the like.

In the case of the cover components, interior finishing materials, exterior materials, or the like, said cover panel 7 may be a synthetic resin panel, and in the case of exterior panels, a chassis frame, or the like, said cover panel 7 may be a metal panel.

Further, in the case of a vehicle, engine noise, road noise, exhaust noise, or the like may be the noise, requiring reduction.

In a case where the object to which said shock and sound absorbing material is to be installed is an electrical appliance, the noise source may be a compressor, motor, fans such as cooling fan, intake fan, exhaust fan, or the like, the outer panel of said consumer electrical appliances, or the like may be said cover panel 7.

In the case where the object to which said shock and sound absorbing material is to be installed relates to civil engineering field or building field, said shock and sound absorbing material may be installed on/in or applied to the following articles.

A sound proof wall of for a road, the surface of a tunnel wall, the casing of air-conditioner or a dynamo, the under surface of an elevated bridge or road, a room partition, wall, ceiling, wall surface of the floor of a building, the wall or roof of an underground shopping mall, or hall or football ground, a railroad train, surface of the wall of the railway, an aircraft, a ship, a heavy machine, an agricultural machine, a machine tool, or the like.

For instance, a sound proof wall, an object laid under the road, a wall material, a building material, a case panel, or the like correspond to said cover panel 7. Further, as for said articles, the culprit noise may be driving sound of a car, a vibrational sound, driving motor sound, engine sound, mechanical sound, echoing sound, chafing sound, or the like.

[Porous Component]

Said porous component 2 of the present invention is made of a thermoplastic resin.

Said thermoplastic resins used in said porous component 2 of the present invention may be as follows.

Polystyrene (PS), polyethylene (PE), polypropylene (PP), copolymerized acrylonitrile-styrene (AS), copolymerized acrylonitrile-butadiene-styrene (ABS), copolymerized acrylonitrile-etylene-styrene (AES), polymethylmethacrylate (PMMA), copolymerized ethylene-propylene (EPR), polyvinyl chloride (PVC), polyvinylidene chloride, copolymerized ethylene-vinyl acetate, or the like. As said polypropylene, a modified polypropylene (modified PP) wherein the polypropylene is modified with PE and/or EPR may be used as said thermoplastic resin. Further, a polymer alloy or polymer blend containing more than two kinds of the aforementioned thermoplastic resin may be used.

Further, as said thermoplastic resin, a biodegradable thermoplastic resin such as a polylactic acid made of the starch obtained from corn, sugar cane, or the like may be used.

A preferable thermoplastic resin for the material of said porous component 2 may be said modified PP.

As the PE used in said modified PP, any kind of PE, like a PE having a density of higher than 0.941, a PE having a medium density in the range of between 0.926 and 0.940, a PE having a low density in the range of between 0.910 and 0.925, and a PE having a super low density of less than 0.909 may be used, said low density PE being preferable since said PE can be mixed closely with PP, and is remarkably effective in improving the elongation of PP.

As said EPR, the rubber like copolymer of ethylene and propylene (hereafter to be described as EPM), the ethylene-propylene-dien terpolymer (hereafter EPDM), wherein ethylene, propylene, and further, dien component such as dicyclopentadiene, ethyliolenenorbornene, 1.4-hexadien or the like are copolymerized together.

In said modified PP, PE and/or EPR is (are) combined in said PP in an amount of between 5 and 30% by mass. In a case where said PE and/or EPR is (are) combined in said PP in an amount of less than 5% by mass, the improvement of the elongation property of said PP may be insufficient, and good moldability may not be secured. On the other hand, in a case where said PE and/or EPR is (are) combined in said PP in an amount of beyond 30% by mass, the resulting modified PP will have poor hardness, and the shape, and dimensional stability, and heat resistance of said porous component 2 made of said modified PP may be inferior.

If necessary, one or more kind(s) of thermoplastic resin such as polyvinylchloride resin, acryl group resin, methacryl group resin, polyvinylidenechloride resin, vinylpropionate group resin, polyester group resin, or the like may be mixed in with said modified PP.

Said modified PP is generally provided as a sheet, and a thermoplastic resin film or a foamed thermoplastic resin film may be formed on one side or both sides of said modified PP sheet, said thermoplastic resin as the material of said film may be a polyolefin such as PE, nonmodified PP, EPR, ethylene-vinylacetatecopolymer, or the like, a vinylchloride group resin, acrylic group resin, methacrylic group resin, vinylidene chloride group resin, styrene group resin, vinyl propionate group resin, styrenebutadiene copolymer, polyester group resin or the like.

A nonmodified PP film is desirable from the view point of its interlaminer adhesion property and the heat resistance property. In a case where an inorganic filler is mixed in with said modified PP, the resulting film will provide a smooth surface of said porous material, and further improve the chemical resistance of said porous material.

Besides said modified PP, a desirable thermoplastic resin as the material for said porous component 2 may be a polymer alloy of an engineering plastic. For instance, in a case where said porous component is used in said shock and sound absorbing material installed around an engine, said shock and sound absorbing material is preferably made from a thermoplastic resin having good heat resistance, and said engineering plastic is a preferable thermoplastic resin having good heat resistance. The preferable engineering plastic is a non-modified engineering plastic, or a polymer alloy of engineering plastic with a thermoplastic such as said modified PP or the like, or a polymer alloy of said engineering plastic with a thermoplastic resin with the exception of said engineering plastic, or a polymer alloy of said engineering plastic with a thermoplastic resin with a exception of said engineering plastic, and a rubberlike material. Said rubber like material may include natural rubber, synthetic rubber, thermoplastic elastomer, or the like.

Said engineering plastic may include a thermoplastic engineering plastic such as polyamide (PA), polyester (PE), polyacetal (POM), polycarbonate (PC), polyethylene terephthalate (PET), polybutylene terephthalate (PBT), polysulfone (PSF), polyether sulfone (PES), polyphenylene ether (PPE), modified polyphenylene ether (modified PPE), polyphenylene sulfide (PPS), polyarylate (PAR), polyether ether ketone (PEEK), polyamide imide (PAT), polyimide (PI), polyether imide (PEI), polyaminobismaleimide, copolymerized methylpentene (TPX), cellulose acetate (CA), or the like, and liquid crystalline engineering plastic such as a polyallylether, or the like, a compression moldable engineering plastic such as a fluorocarbongroup resin like polytetrafluoroethylen (PTFE), or the like, a crystalline polyester such as crystalline polyethylene telephaterlate, crystalline polybutylenetelephatalate, or the like, a stereoregular polystyrene such as syndiotactic polystyrene, isotactic polystyrene, or the like. Said engineering plastic preferably has a melting point of higher than 200° C. Said engineering plastic is used singly or as a mixture combining two or more kinds of said engineering plastics.

Said modified PPE may be a graft polymer, wherein a styrene group monomer(s) is (are) grafted to PPE or a polymer alloy wherein a styrene group polymer is (are) mixed to PPE. Said styrene group monomer may include styrene, α-methylstyrene, α-ethylstyrene, α-methylvinyltoluene, α-methyldialkylstyrene, o-, m-, or p-vinyltoluene, o-ethylstyrene, p-ethylstyrene, 2,4-dimethylstyrene, o-chlorostyrene, p-chlorostyrene, o-bromostyrene, 2,4-dichlorostyrene, 2-chloro-4-methylstyrene, 2,6-dichlorostyrene, vinylnaphthalene, vinylanthracene, and the like, and said styrene group polymer may include polystyrene, styrene-acrylonitrile resin, acrylonitrile-butadiene-styrene resin (ABS), high impact polystyrene (HIPS), or the like.

In a case wherein said porous component is made of a polymer alloy of said engineering plastic and a thermoplastic resin with the exception of said engineering plastic, said thermoplastic resin used in said polymer alloy may include such as polyolefin group resin, such as polyethylene, polypropylene, copolymerized ethylene-propylene, copolymerized ethylene-vinyl acetate, or the like, polystyrene group resin such as polystyrene, styrene-acrylonitrile resin, acrylonitrile-butadiene-styrene resin, or the like, polyamide group resin such as polycaprolactam (Nylon6), polyhexamethylene adipamide (Nylon66), polyhexamethylene sebacamide (Nylon610), polyundeca-1-lactam (Nylon11), polydodeca-1-lactam (Nylon12), or the like. Said thermoplastic resin may be used singly or two or more kinds of said thermoplastic resin may be used together.

Further, a compatibility aid agent may be added to said polymer alloy to improve the compatibility of each component.

Said compatibility aid agent is made of a chemical compound having compatibility with each of the components in said polymer alloy, providing each component of said polymer alloy with a uniform mixing state, while helping said components intermediate. Accordingly, the character of each component is utilized effectively, so that said polymer alloy has both good heat resistance and moldability, and can easily be manufactured into a core member, having a complex shape, by such as vacuum forming.

For instance, as a compatibility aid agent for the polymer alloy of an aromatic engineering plastic such as PPE, modified PPE, PPS or the like, and a polyolefin such as polypropylene, or the like (including a polymer alloy containing a rubber-like material), for instance, a block or graft copolymer, wherein PPE and polypropylene are chemically bonded, a block or graft copolymer of polypropylene and polystyrene, a block or graft copolymer of PPE and ethylenebutene copolymer, a hydrogenated diblock copolymer or triblock copolymer of an alkenyl aromatic compound (such as styrene) and a conjugated diene compound (such as butadiene, isoprene) or the like, are used.

Further, as a compatibility aid agent for the polymer alloy of said aromatic engineering plastic and polyamide resin (including a polymer alloy containing a rubber-like material), for instance (a) a compound containing both (i) ethylenical carbon-carbon double bond, or carbon-carbon triple bond, and (ii) a carboxylic acid, acid anhydride, acid amide, imide, carboxylic ester, amine or hydroxyl group, (b) a liquid diene polymer (c) an epoxy compound, (d) a polycarboxylic acid or derivative thereof, (e) an oxidized polyolefin wax, (f) a compound containing an acryl functional group, (g) a chloroepoxytriazine compound, and (h) a trialkyl amine salt of maleic acid or fumaric acid may be used.

A detailed description of said compatibility aid agents (a) to (h) is shown in TOKKAIHEI 09-12497, and further, each compatibility aid agent (a) to (h) is disclosed in U.S. Pat. No. 4,315,086 (the document which refers to (a), (b) and (c)), U.S. Pat. No. 4,873,286 (the document which refers to (d)), U.S. Pat. No. 4,659,760 (the document which refers (e)), U.S. Pat. No. 4,642,358 and U.S. Pat. No. 4,600,741 (the documents which refer to (f)), U.S. Pat. No. 4,895,945, U.S. Pat. No. 5,096,979, U.S. Pat. No. 5,089,566 and U.S. Pat. No. 5,041,504 (the documents which refers to (g)), U.S. Pat. No. 4,755,566 (the document which refers to (h)).

Usually, said compatibility aid agent is added to said polymer alloy in an amount of 0.1 to 60% by weight.

Many kinds of additives may be added to said thermoplastic resin or said polymer alloy, in so as far as the object of the present invention is not spoiled. Said additives may be inorganic fillers such as calcium carbonate, magnesium carbonate, barium sulphate, calcium sulphate, calcium sulfite, calcium phosphate, calcium hydroxide, magnesium hydroxide, aluminum hydroxide, magnesium oxide, titanium oxide, iron oxide, zinc oxide, alumina, silica, diatom earth, dolomite, gypsum, talc, clay, asbestos, mica calcium, silicate bentonite, white carbon, carbon black, iron powder, aluminum powder, glass powder, stone powder, blast furnace slag, fly ash, cement zirconia powder, or the like. Said additive may be used singly, or two or more kinds of said additives may be used together in order to improve mechanical strength and thermal resistance.

Further, more kinds of additives may be added to said thermoplastic resin or said polymer alloy in or order to improve its form preservation, dimensional stability, compression and pulling strength, and the like. Said additives may be an organic fillers such as hater, linen, sisal, wood flour, coconut flour, or the like; walnut flour, starch, wheat flour or the like; natural fibers such as cotton, hemp, bamboo fiber, coconut fiber, wool, asbestos fiber, kenaf, or the like; a synthetic fiber such as polyamide fiber, polyester fiber, polyolefin fiber, acrylic fiber, vinyl chloride fiber, vinylidene chloride fiber, or the like; a semisynthetic fiber such as viscose fiber, acetate fiber or the like; inorganic fiber such as asbestos fiber, glass fiber carbon fiber, ceramic fiber, metallic fiber, whisker or the like. Said additive may be used singly, or two or more kinds of said additives may be used together. Said inorganic or organic filler or fiber type filler is added to said thermoplastic in an amount of between 0.05 and 200% by weight.

Said thermoplastic resin or said polymer alloy may be colored by pigment and/or dye and classified. Further, a plasticizer such as DOP, DBP or the like, an antioxidant, antistatic agent, crystallization agent, flame retardant, antiflaming agent, insect repellent, antiseptic, wax material, lubricant, stabilizer, age resister, ultraviolet absorber, foaming agent such as chemical foaming agent or capsulated type foaming agent, or the like may be added. Said additive may be used singly, or two or more kinds of said additives may be used after mixing together.

Said porous component 2 has a large number of holes and a lattice type panel in which a plural number of square tubular open cells 2A are arranged lengthwise and breadthwise as shown in FIG. 2.

To manufacture said porous components 2, generally, a thermoplastic sheet B is molded by vacuum and/or pressure forming, or press molding so as to form a plural number of square tubular blind indentations 2C lengthwise and breadthwise, as shown in FIG. 3, after which the resulting blind indentations 2C are blanked with a blanking die so as to hollow out bottoms of blind indentations 2C along the dotted line, as shown in FIG. 3 and to form square tubular open cells 2A. In this case, some selected square tubular blind indications' 2C bottoms are partially hollowed out, leaving spaces for forming pedestals 2D to attach a surface material 3. A hole 2E to insert a tightening means such as screw, bolt, or the like is formed in each pedestal 2D.

Usually, the thickness of said thermoplastic sheet B is preferably set to be in the range of between 0.1 and 0.8 mm.

The thickness T of said porous component 2 (see FIG. 2) is properly settled corresponding to the frequency of the sound waves to be absorbed by the final product. In other words, it is desirable to settle the thickness T of said porous material 2 so as to be substantially equal to the height (depth) of the cell formed between said surface material 3 and said cover panel 7 in said shock and sound absorbing material 1, and substantially ¼ of the wavelength of the sound wave to be absorbed, or substantially odd number times ¼ of the wavelength of the sound wave to be absorbed.

Further, the sound waves to be absorbed by the cell structure are the sound waves penetrating said surface material 3 without being absorbed, and the wavelength of said sound waves can be controlled by adjusting the airflow resistance of each layer in said surface material 3. setting the airflow resistance of the whole of said surface material 3, the entanglement of said stretchable paper material's fibers together, or the unit weight of said stretchable paper material, and further in a case where the synthetic resin is coated on or impregnated in to said stretchable paper material, the wave length of the sound waves can be adjusted by the coating or impregnating amount of said synthetic resin.

Herein, the relationship between the wave length λ(m) and frequency f ($H_z$), is as follows.

$$a=c/f$$

wherein c (m/s) is the speed of sound.
Accordingly, the thickness T of said porous material 2 is as follows.

$$T=(\lambda/4)\times M=(c/4f)\times M \text{ (}M\text{ is a positive odd number).}$$

For instance, in a case where the sound wave to be absorbed is a noise from a source such as the engine of a car, or the like, the frequency of said sound wave is in the range of between 1000 and 5000$H_2$, so that if said sound wave is absorbed only by said porous components 2, a plural number of said porous components 2 having varying thicknesses to each other may be necessary. Assuming that M is 1 (minimum value) and c=340 m/s, the minimum thickness T of said porous component may be 17 mm, and the maximum thickness T of said porous component may be 85 mm.

In the present invention, said surface material 3 is laminated onto said porous component 2 in said shock and sound absorbing material 1, with said sound wave to be absorbed being set to penetrate through said surface material 3 so as to damp, said sound wave, so that it can be absorbed effectively and adequately. Accordingly, the energy of said sound wave to be absorbed by the cell structure (said sound wave being a standing wave which is a synthesis of an incident wave and reflective wave) damped enough by said surface material 3 so as to be a weak energy by said surface material 3, and said sound waves tend to have little penetrative ability, namely, sound waves having a high frequency, and very short wave length. Accordingly, the thickness of said shock and sound absorbing material of the present invention can be reduced substantially as compared with a conventional sound absorbing material, wherein the sound waves are absorbed by only porous component 2.

In a case where the object to which said shock and sound absorbing material of the present invention is to be installed is a vehicle such as a car, the preferable thickness T of said porous component 2 may be set to be in the range of between 2 mm and 15 mm, more preferably 2 mm and 10 mm.

In a case where the object to which said shock and sound absorbing material of the present invention is installed is a consumer electrical appliance or electric appliance such as a PC, preferable thickness T of said porous component 2 may be set to be in the range of between 1 mm and 20 mm, more preferably 1 mm and 15 mm.

In a case where the object to which said shock and sound absorbing material of the present invention is to be installed is an object relating to building construction, the preferable thickness T of said porous component 2 may be set to be in the range of between 2 mm-60 mm, more preferably 2 mm-55 mm.

In a case where the object to which said shock and sound absorbing material of the present invention is to be installed is a railroad car, ship, or the like, preferable thickness T of said porous component 2 may be set to be in the range of between 5 mm and 70 mm, more preferably 5 mm and 60 mm.

In a case where the object to which said shock and sound absorbing material of the present invention is to be installed is an object relating to civil engineering, such as an expressway, the preferable thickness T of said porous component 2 may be set to be in the range of between 10 mm and 100 mm, more preferably 15 mm and 90 mm.

Further, said porous component 2 shown in FIG. 2, illustrates a case in which the object to which said porous component 2 is to be installed is in a car. In said porous component 2, said open cells 2A are square shaped in plane view, and generally the length of each side may be se to be in the range of between about 8 cm to 12 cm. In the case of said open cells 2A shown as in FIG. 2, they have a square shape in plane view, but in the present invention, aside from said open cells 2A being square shaped in plane view, said open cells 2A can also have a plane round shape, plane triangular shape, plane rectangular shape, or plane polygonal shape such as plane pentagonal shape, plane hexagonal shape, or the like.

[Stretchable Paper Material]

Said stretchable paper material is used as the second sound absorbing layer 5 of the present invention, and as said stretchable paper material, stretchable flat paper, a creped paper, wherein fine wrinkles (wrinkle-like unevenness) are formed on the surface of the paper, an embossed paper, wherein a large number of projections are formed on the surface of the paper, an embossed and creped paper, wherein fine wrinkles and a large number of projections are formed on the surface of the paper, a kitchen roll, or the like are illustrated.

Said creped paper is a paper onto which creping processing is performed, said creping processing including wet creping processing, wherein a wet paper sheet is compressed by a press roll, doctor blade, or the like in the lengthwise direction (papering direction) and dry creping processing, wherein a paper sheet is dried by a Yankee dryer or calendar, then compressed by a doctor blade, or the like in the lengthwise direction. Said crepe processed stretchable paper material preferably has a creping degree in the range of between 10 and 50%.

Herein said creping degree is calculated using the following formula.

Creping degree (%)=$(A/B) \times 100$ wherein A is the papering speed in the paper production process, and B is the rolling speed of the paper.

In other words, said creping degree is the ratio of the compression of the paper in the papering direction (See Tokkai 2002-327399, Tokuhyo H10-510886)

In a case where the creping degree is below 10%, said creped paper (stretchable paper material) will not vibrate easily due to sound pressure, resulting in a deterioration of the damping effect, sound absorbing performance, and its stretch ability, bringing about wrinkling during molding. On the other hand, a creping degree of beyond 50%, will also bring about wrinkling during molding.

Said embossed paper is a paper the surface of which has many projections, as a result of the green paper having been processed with a roll or plate having uneven surface which is formed by carving or etching (embossing roll, embossing plate), and the height of each projection is preferably in the range of between 0.02 mm and 2.00 mm, and the number of said projections is preferably in the range of between 20 and 200 projection/cm$^2$. In a case where the height of said projection is below 0.02 mm, the resulting embossed paper (stretchable paper) will have an inferior sound absorbing performance and an insufficient stretchability, so that such a paper is apt to produce wrinkles during molding.

Further, in a case where the height of said projections is beyond 2.00 mm, the resulting embossed paper will be also apt to produce wrinkles during molding. Further, in a case where the number of said projections is below 20 projections/cm$^2$, the resulting embossed paper will have an inferior sound absorbing performance, and insufficient stretchability, so that such a paper is apt to produce wrinkles during molding.

Further, in a case where the number of said projections is beyond 200 projections/cm$^2$, the resulting embossed paper (stretchable paper material) will also have an inferior sound absorbing performance.

Regarding the situation in which excessively low projection of said embossed paper results in an inferior sound absorbing performance, the following reason is considered. In a case where said embossed paper has excessively low projections, the height (depth) of said cells constructed by said projections in said surface material 3 are shortened to shift the object sound to be absorbed by said embossed paper from a low sound range (long wave length) in which said sound is easily absorbed as noise, to a middle or high sound range.

Regarding the situation that in a case where the number of projections is of an excessively small number, the following reason is considered, namely, the resulting embossed paper has an inferior sound absorbing performance, because a cell structure which can demonstrate an adequate sound absorbing performance is not formed on said surface material. On the other hand, regarding the situation that in a case where the number of projections is of an excessively large number, the following reason is considered. The resulting embossed paper reflects the reflected wave diffusely within the cell so as to shift the sympathetic vibration range from the object sound to be absorbed.

Herein, in FIG. 4, the height of the projections formed on the second sound absorbing layer, made of said stretchable paper material, which is an embossed paper, is represented as "h" in FIG. 4.

Further, in a case where said creped paper is used as a green paper in said embossing process, embossed and creped paper is manufactured.

As pulp used for said creped paper and embossed paper, for instance, broad-leaved tree wood pulp, conifer wood pulp, hemp pulp, kenaf pulp, bamboo pulp, esparto pulp, bagasse pulp, reed pulp, or the like may be illustrated. Synthetic fibers may be mixed into said natural pulp, which is wood pulp, non-wood pulp, or the like, in an amount in the range of between 40 and 50% by mass.

The unit weight of said stretchable paper material is preferably in the range of between 10 and 50 g/m². In a case where the unit weight of said stretchable paper material is below 10 g/m², the moldability of the resulting stretchable paper material may deteriorate, and produce wrinkles during molding, and the damping effect and sound absorbing performance of said stretchable paper material may also deteriorate. On the other hand, in a case where the unit weight of said stretchable paper material is beyond 50 g/m², the weight of the paper increases, and the modability of said stretchable paper material may deteriorate.

The air flow resistance of said stretchable paper material is preferably at least higher than 0.06 kPa·s/m.

Said airflow resistance R (Pa·s/m) is a barometer expressing the air-permeable material's degree of permeability. To measure said airflow resistance R, the steady flow differential-pressure measuring method may be applied. As shown in FIG. 5, a test piece T is arranged in a cylindrical duct W, and then air is blown into said duct at a constant flow V as shown by the arrow, to measure the difference in pressure between said duct's inlet side P1, and outlet side P2. The air-flow resistance is calculated using the following formula.

$$R = \Delta P / V$$

Wherein $\Delta P$ is the difference in pressure Pa($\Delta P = P1 - P2$), and V represents the volume of airflow in said unit cross section area of said duct (m³/m²·s).

Said airflow resistance can be measured with such as the airflow tester (Trade Name: KES-F8-AP1, KATO TECH CO., LTD. The steady flow differential pressure measuring method).

The airflow resistance of said stretchable paper material of the present invention is properly settled corresponding to the frequency of the object sound wave to be absorbed in the final product. Adjustment of the airflow resistance may be controlled by the entanglement of fibers or the unit weight of said stretchable paper material, or in a case where the synthetic resin is coated on or impregnated in to said stretchable paper material, the airflow resistance can be adjusted by the amount of synthetic resin used for coating or impregnating.

As said synthetic resin which is coated on or impregnated in to said stretchable paper material, both a thermoplastic resin and/or thermosetting resin can be used.

As said thermoplastic resin, such as an acrylate resin, methacrylate resin, ionomer resin, ethylene-ethyl acrylate (EEA) resin, copolymerized acrylonitrile-styrene-acrylic rubber (ASA) resin, copolymerized acrylonitrile-styrene (AS) resin, copolymerized acrylonitrile-chlorinated polyethylene-styrene (ACS) resin, copolymerized ethylene-vinyl acetate (EVA) resin, copolymerized ethylene-vinyl alcohol (EVOH) resin, polymethylmethacrylate resin (PMMA), polybutadiene (BDR), polystyrene (PS), polyethylene (PE), copolymerized acrylonitrile-butadiene-styrene (ABS) resin, chlorinated polyethylene (CPE), polyvinyl chloride (PVC), polyvinylidene chloride (PVDC), polypropylene (PP), cellulose acetate (CA) resin, syndiotactic polystyrene (SPS), polyoxymethylene (=polyacetal) (POM), polyamide (PA), polyimide (PI), polyamide imide (PAI), polyether imide (PEI), polyarylate (PAR), thermoplastic polyurethane (TPU), elastomer, thermoplastic elastomer (TPE), liquid crystal polymer (LCP), polyether ether ketone (PEEK), polysulfone (PSF), polyether sulfone (PES), fluorocarbon polymer, polytetrafluoroethylene (PTFE), polyethylene terephthalate (PET), polycarbonate (PC), polyphenylene ether (PPE), modified PPE, polyphenylene sulfide (PPS), polybutylene terephthalate (PBT), polybenzimidazole (PBI), wholly aromatic polyester (POB), or the like, may be illustrated.

Two or more kinds of said thermoplastic resin may be mixed and used together, and small amount of said thermosetting resin may be mixed in with said thermoplastic resin(s), in so far as the thermoplasticity of said stretchable paper material is not obstructed. Two or more kinds of said thermosetting resin may be mixed together.

From a view point of the easiness of handling, said thermoplastic resin is preferably provided as an aqueous solution, aqueous emulsion, or aqueous dispersion, and may also be provided as an organic solvent solution.

Said thermosetting resin may be such as a urethane resin, melamine resin, thermosetting acrylic resin, especially a thermosetting acrylic resin which is formed into an ester bond and stiffened by heating, a urea resin, phenol resin, epoxy resin, thermosetting polyester, or the like, and further, a synthetic resin precursor utilized to produce said synthetic resin may be also used. Said synthetic resin precursor may include such as a prepolymer, oligomer, and a monomer such as urethane resin prepolymer, urea prepolymer (precondensation polymer phenol group resin prepolymer (precondensation polymer), diallyl phthalate prepolymer, acrylic oligomer, polyatomic isocyanate, methacrylic ester monomer, diallyl phthalate monomer, or the like. For easy handling, said thermosetting resin is preferably provided as an aqueous solution, aqueous emulsion, or aqueous dispersion, and may also be provided as an organic solvent solution.

The addition of said synthetic resin, especially said thermosetting resin, improves the retention of the molded shape, and rigidity of said stretchable paper material.

[Phenol Group Compound]

A phenol group resin is an especially preferable synthetic resin in the present invention.

Said phenol group resin is produced by the condensation of a phenol group compound, and formaldehyde, and/or a formaldehyde donor.

The phenol group compound used to produce said phenol group resin may be a monohydric phenol, or polyhydric phenol, or a mixture of monohydric phenol and polyhydric phenol, but in a case where only a monohydric phenol is used, formaldehyde is apt to be emitted when or after said resin composition is cured, making polyphenol or a mixture of monophenol and polyphenol most desirable.

(Monohydric Phenol)

The monohydric phenols include an alkyl phenol such as o-cresol, m-cresol, p-cresol, ethylphenol, isopropylphenol, xylenol, 3,5-xylenol, butylphenol, t-butylphenol, nonylphenol, or the like; a monohydric derivative such as o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-aminophenol, m-aminophenol, p-aminophenol, o-nitrophenol, m-nitrophenol, p-nitrophenol, 2,4-dinitrophenol, 2,4,6-trinitrophenol or the like; a monohydric phenol of a polycyclic aromatic compound such as naphthol or the like. Each monohydric phenol can be used singly, or as a mixture thereof.

(Polyhydric Phenol)

The polyhydric phenols mentioned above include resorcin, alkylresorcin, pyrogallol, catechol, alkyl catechol, hydroquinone, alkyl hydroquinone, phloroglucinol, bisphenol, dihydroxynaphthalene or the like. Each polyhydric phenol can be used singly, or as a mixture thereof, Resorcin and alkylresorcin are more suitable than other polyhydric phenols. Alkylresorcin, in particular, is the most suitable of polyhydric phenols because alkylresorcin can react with aldehydes more rapidly than resorcin.

The alkylresorcins include 5-methyl resorcin, 5-ethyl resorcin, 5-propyl resorcin, 5-n-butyl resorcin, 4,5-dimethyl resorcin, 2,5-dimethyl resorcin, 4,5-diethyl resorcin, 2,5-diethyl resorcin, 4,5-dipropyl resorcin, 2,5-dipropyl resorcin, 4-methyl-5-ethyl resorcin, 2-methyl-5-ethyl resorcin, 2-methyl-5-propyl resorcin, 2,4,5-trimethyl resorcin, 2,4,5-triethyl resorcin, or the like.

A polyhydric phenol mixture produced by the dry distillation of oil shale, which is produced in Estonia, is inexpensive, and includes 5-methyl resorcin, along with many other kinds of alkylresorcin which is highly reactive, so that said polyhydric phenol mixture is an especially desirable raw polyphenol material for the present invention.

Further, among said polyhydric phenols, one or a mixture of two or more kinds of resorcin group compound such as resorcin, alkylresorcin or the like (including a polyhydric phenol mixture produced by the dry distillation of oil shale which is produced in Estonia), and a resorcin group resin consisting of aldehyde and/or an aldehyde donor, are desirable for use as a phenol group resin in the present invention.

[Formaldehyde Donor]

In the present invention, said phenol group compound and formaldehyde and/or formaldehyde donor are condensed together. Said formaldehyde donor refers to a compound, or mixture thereof which emits aldehyde when said compound or mixture decomposes. Said aldehyde donor is such as paraformaldehyde, trioxane, hexamethylenetetramine, tetraoxymethylene, or the like. In the present invention, a formaldehyde and formaldehyde donor are combined together, hereafter to be described as a formaldehyde group compound.

[Production of Phenol Group Resin]

There are two types of said phenol group resin, one is a resol type, which is produced by the reaction between said phenol group compound and an excess amount of said formaldehyde group compound, using an alkali as a catalyst, and the other novolak type is produced by the reaction between an excess amount of said phenol group compound and formaldehyde group compound, using an acid as a catalyst. Said resol type phenol group resin consists of various phenol alcohols produced by the addition of formaldehyde to phenol, and is commonly provided as a water solution, while said novolak phenol group resin consists of various dihydroxydiphenylmethane group derivatives, wherein said phenol group compounds are further condensed with phenol alcohols, said novolak type phenol group resin being commonly provided as a powder.

As for the use of said phenol group resin in the present invention, said phenol group compound is first condensed with a formaldehyde group compound to produce a precondensate, after which the resulting precondensate is applied to said fiber sheet, thus being followed by resinification with a curing agent, and/or by heating.

To produce said condensate, a monohydric phenol may be condensed with a formaldehyde group compound to produce a homoprecondensate, or a mixture of monohydric phenol and polyhydric phenol may be condensed with a formaldehyde group compound to produce a coprecondensate of monohydric phenol and polyhydric phenol. To produce said coprecondensate, either of said monohydric phenol or polyhydric phenol may be previously condensed with said formaldehyde group compound to produce a precondensate, or both monohydric phenol and polyhydric phenol may be condensed together.

In the present invention, the desirable phenol group resin is a phenol-alkylresorcin cocondensation polymer. Said phenol-alkylresorcin cocondensation polymer provides a water solution of said cocondensation polymer(pre-cocondensation polymer) haying good stability, and being advantageous in that it can be stored for a longer time at room temperature, as compared with a condensate consisting of only a phenol (precondensation polymer). Further, in a case where said sheet material is impregnated or coated with said water solution, and then precured, said fiber sheet has good stability and does not lose its moldability after longtime storage. Further, since alkylresorcin is highly reactive to a formaldehyde group compound, and catches free aldehydes to react with, the content of free aldehydes in said resin can be reduced.

The desirable method for producing said phenol-alkylresorcin cocondensation polymer is first to create a reaction between phenol and a formaldehyde group compound to produce a phenol group resin precondensate, and then to add alkylresorcin, and if desired, a formaldehyde group compound, to said phenol group resin precondensate, to create a reaction.

In the case of method for the condensation of a monohydric phenol and/or polyhydric phenol, and a formaldehyde group compound, 0.2 to 3 moles of said formaldehyde group compound is added to 1 mole of said monohydric phenol; 0.1 to 0.8 mole of said formaldehyde group compound is added to 1 mole of said polyhydric phenol, as usual. If necessary, additives may be added to the phenol resins (precondensation polymers). In said method(s), there is a condensation reaction caused by applying heat at 55 to 100° C. for 8 to 20 hours. The addition of said formaldehyde group compound may be made once, at the beginning of the reaction, or several separate times throughout the reaction, or said formaldehyde group compound may be dropped in continuously throughout said reaction.

Further, if desired, the phenol group compounds and/or precondensates thereof may be copolycondensed with amino resin monomers such as urea, thiourea, melamine, thiomelamine, dicyandiamine, guanidine, guanamine, acetoguanamine, benzoguanamine, 2,6-diamino-1.3-diamine, and/or with the precondensation polymers of said amino resin monomers, thus producing said phenol group resins.

To produce said phenol group resin, a catalyst, or pH control agent, may be mixed in, if needed, before, during, or after the reaction. Said catalyst or pH control agent is, for example, an organic or inorganic acid such as hydrochloric acid, sulfuric acid, orthophosphoric acid, boric acid, oxalic acid, formic acid, acetic acid, butyric acid, benzenesulfonic acid, phenolsulfonic acid, p-toluenesulfonic acid, naphthalene-α-sulfonic acid, naphthalene-β-sulfonic acid, or the like; an organic acid ester such as oxalic dimethyl ester, or the like; an acid anhydride such as maleic anhydride, phthalic anhydride, or the like; an ammonium salt such as ammonium chloride, ammonium sulfate, ammonium nitrate, ammonium oxalate, ammonium acetate, ammonium phosphate, ammonium thiocyanate, ammonium imide sulfonate, or the like; an organic halide such as monochloroacetic acid or its sodium salt, α,α'-dichlorohydrin, or the like; a hydrochloride of amines such as triethanolamine hydrochloride, aniline hydrochloride, or the like; a urea adduct such as salicylic acid urea adduct, stearic acid urea adduct, heptanoic acid urea adduct, or the like; an acid substance such as N-trimethyl taurine, zinc chloride, ferric chloride, or the like; ammonia; amines; a hydroxide of an alkaline metal or alkaline earth metal such as sodium hydroxide, potassium hydroxide, barium hydroxide, calcium hydroxide, or the like; an oxide of an alkaline earth metal such as lime, or the like; an alkaline substance like an alkaline metal salt of weak acid such as sodium carbonate, sodium sulfite, sodium acetate, sodium phosphate or the like.

Further, curing agents such as a formaldehyde group compound or alkylol triazone derivative, or the like, may be added to said phenol group resin precondensate (including precocondensation polymer).

Said alkylol triazone derivative is produced by the reaction between the urea group compound, amine group compound, and formaldehyde group compound. Said urea group compound used in the production of said alkylol triazone derivative may be such as urea, thiourea, an alkylurea such as methylurea or the like; an alkylthiourea such as methylthiourea or the like; phenylurea, naphthylurea, halogenated phenylurea, nitrated alkylurea, or the like, or a mixture of two or more kinds of said urea group compound. A particularly desirable urea group compound may be urea or thiourea. As amine group compounds, an aliphatic amine such as methyl amine, ethylamine, propylamine, isopropylamine, butylamine, amylamine or the like, benzylamine, furfuryl amine, ethanol amine, ethylenediamine, hexamethylenediamine hexamethylenetetramine, or the like, as well as ammonia are illustrated, and said amine group compound is used singly or two or more amine group compounds may be used together. The formaldehyde group compound(s) used for the production of said alkylol triazone derivative is (are) the same as the formaldehyde group compound(s) used for the production of said phenol group resin precondensate.

To synthesize said alkylol triazone derivatives, commonly 0.1 to 1.2 moles of said amine group compound(s) and/or ammonia, and 1.5 to 4.0 moles of said formaldehyde group compound are reacted with 1 mole of said urea group compound. In said reaction, the order in which said compounds are added is arbitrary, but preferably, the required amount of formaldehyde group compound is put in a reactor first, after which the required amount of amine group compound(s) and/or ammonia is (are) gradually added to said formaldehyde group compound, the temperature being kept at below 60° C., after which the required amount of said urea group compound(s) is (are) added to the resulting mixture at 80 to 90° C. for 2 to 3 hours, being agitated so as to react together. Usually, 37% by mass of formalin is used as said formaldehyde group compound, but some of said formalin may be replaced with paraformaldehyde, to increase the concentration of the reaction product. Further, in a case where hexamethylene tetramine is used, the solid content of the reaction product obtained is much higher. The reaction between said urea group compound, amine group compound and/or ammonia, and said formaldehyde group compound is commonly performed in a water solution, but said water may be partially or wholly replaced with one or more kinds of alcohol such as methanol, ethanol, isopropanol, n-butanol, ethylene glycol, diethylene glycol, or the like, and one or more kinds of other water soluble organic solvent, such as ketone group solvent like acetone, methylethyl ketone, or the like can also be used as solvents. The amount of said curing agent to be added is, in the case of a formaldehyde group compound, in the range of between 10 and 100 parts by mass, to 100 parts by mass of said phenol group resin precondensate (precocondensation polymer) of the present invention, and in the case of an alkylol triazone derivative, 10 to 500 parts by mass to 100 parts by mass of said phenol group resin precondensate (precocondensation polymer).

[Sulfomethylation and/or Sulfimethylation of a Phenol Group Resin]

To improve the stability of said water soluble phenol group resin, said phenol group resin is preferably sulfomethylated and/or sulfimethylated.

[Sulfomethylation Agent]

The Sulfomethylation agents used to improve the stability of the aqueous solution of phenol group resins, include such as water soluble sulfites prepared by the reaction between sulfurous acid, bisulfurous acid, or metabisulfurous acid, and alkaline metals, trimethyl amine, quaternary amine or quaternary ammonium (e.g. benzyltrimethylammonium); and aldehyde additions prepared by the reaction between said water soluble sulfites and aldehydes.

The aldehyde additives are prepared by the addition reaction between said aldehydes and water soluble sulfites as aforementioned, wherein the aldehydes include formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde, or the like. For example, hydroxymethane sulfonate, which is an aldehyde additive, is prepared by the addition reaction between formaldehyde and sulfite.

[Sulfimethylation Agent]

The sulfimethylation agents used to improve the stability of the aqueous solution of phenol group resins, include alkaline metal sulfoxylates of an aliphatic or aromatic aldehyde such as sodium formaldehyde sulfoxylate (a.k.a. Rongalite), sodium benzaldehyde sulfoxylate, or the like; hydrosulfites (a.k.a. dithionites) of alkaline metal or alkaline earth metal such as sodium hydrosulfite, magnesium hydrosulfite, or the like; and a hydroxyalkanesulfinate such as hydroxymethanesulfinate, or the like.

In a case where said phenol group resin precondensate is sulfomethylated and/or sulfimethylated, said sulfomethylation agent and/or sulfimethylation agent can be added to said precondensate at any stage, to sulfomethylate and/or sulfimethylate said phenol group compound and/or said precondensate.

The addition of said sulfomethylation agent and/or sulfimethylation agent may be carried out at any stage, before, during or after the condensation reaction.

The total amount of said sulfomethylation agent and/or sulfimethylation agent to be added is in the range of between 0.001 and 1.5 moles per 1 mole of said phenol group compound. In a case where the total amount of said sulfomethylation agent and/or sulfimethylation agent to be added is less than 0.001 mole per 1 mole of said phenol group compound, the resulting phenol group resin will have an insufficient hydrophilic property, while in a case where the total amount of said sulfomethylation agent and/or sulfimethylation agent to be added is over 1.5 moles per 1 mole of said phenol group compound, the resulting phenol group resin will have insufficient water resistance. To maintain good performance, in such as the curing capability of said produced precondensate, and the properties of the resin after curing, or the like, the total amount of said sulfomethylation agent and/or sulfimethylation agent is preferably set to be in the range of between about 0.01 and 0.8 mole for said phenol group compound.

Said sulfomethylation agent and/or sulfimethylation agent added to said precondensate, to effect the sulfomethylation and/or sulfimethylation of said precondensate, react(s) with the methylol group of said precondensate, and/or the aromatic group of said precondensate, introducing a sulfomethyl group and/or sulfimethyl group to said precondensate.

As aforementioned, an aqueous solution of sulfomethylated and/or sulfimethylated phenol group resin precondensate is stable in a wide range, between acidity (pH1.0), and alkalinity, with said precondensate being curable within any range, acidity, neutrality, or alkalinity. In particular, in a case where said precondensate is cured in an acidic range, the remaining amount of said methylol group decreases, solving the problem of formaldehyde being produced by the decomposition of said cured precondensate.

Into said synthetic resin used in the present invention, further, the following substances may be added or mixed. Said substances includes, for instance, an inorganic filler, such as calcium carbonate, magnesium carbonate, barium sulfate, calcium sulfate, calcium sulfite, calcium phosphate, calcium hydroxide, magnesium hydroxide, aluminium hydroxide, magnesium oxide, titanium oxide, iron oxide, zinc oxide, alumina, silica, colloidal silica, diatomaceous earth, dolomite, gypsum, talc, clay, asbestos, mica, calcium silicate, bentonite, white carbon, carbon black, iron powder, aluminum powder, glass powder, stone powder, blast furnace slag, fly ash, cement, zirconia powder, or the like; a natural rubber or its derivative; a synthetic rubber such as styrene-butadiene rubber, acrylonitrile-butadiene rubber, chloroprene rubber, ethylene-propylene rubber, isoprene rubber, isoprene-isobutylene rubber, or the like; a water-soluble macromolecule and natural gum such as polyvinyl alcohol, sodium alginate, starch, starch derivative, glue, gelatin, powdered blood, methyl cellulose, carboxy methyl cellulose, hydroxy ethyl cellulose, polyacrylate, polyacrylamide, or the like; an organic filler such as, wood flour, walnut powder, coconut shell flour, wheat flour, rice flour, or the like; a higher fatty acid such as stearic acid, palmitic acid, or the like; a fatty alcohol such as palmityl alcohol, stearyl alcohol, or the like; a fatty acid ester such as butyryl stearate, glycerin stearate, or the like; a fatty acid amide; a natural wax or composition wax such as carnauba wax, or the like; a mold release agent such as paraffin, paraffin oil, silicone oil, silicone resin, fluorocarbon polymers, polyvinyl alcohol, grease, or the like; an organic blowing agent such as azodicarbonamido, dinitroso pentamethylene tetramine, p,p'-oxibis(benzene sulfonylhydrazide), azobis-2,2'-(2-methylpropionitrile), or the like; an inorganic blowing agent such as sodium bicarbonate, potassium bicarbonate, ammonium bicarbonate or the like; hollow particles such as shirasu balloon, perlite, glass balloon, plastic foaming glass, hollow ceramics, or the like; foaming bodies or particles such as foaming polyethylene, foaming polystyrene, foaming polypropylene, or the like; a pigment; dye; antioxidant; antistatic agent; crystallizer; a flame retardant such as phosphorus group compound, nitrogen group compound, sulfur group compound, boron group compound, bromine group compound, guanidine group compound, phosphate group compound, phosphoric ester group compound, amine group resin, or the like; a flameproofing agent; water-repellent agent; an oil-repellent agent; insecticide agent; a preservative; wax; surfactant; lubricant; antioxidant; ultraviolet absorber; a plasticizer such as phthalic ester (ex. dibutyl phthalate (DBP), dioctyl phthalate (DOP), dicyclohexyl phthalate) and others (ex. tricresyl phosphate).

[Air-Permeable Porous Component]

The first sound absorbing layer 4 made of an air-permeable porous component is attached onto the back side of said second sound absorbing layer 5 made of said stretchable paper material so as to reinforce said second sound absorbing layer 5 and to give said second sound absorbing layer 5 sound absorbing effectiveness.

As said air-permeable porous material, a fiber sheet such as a nonwoven fabric, a knit and woven fiber sheet, or the like, an air-permeable foamed synthetic resin such as polyurethane foam, polyethylene foam, polypropylene foam, polystyrene foam, polyvinyl chloride foam, epoxy resin foam, melamine resin foam, urea resin foam, phenol resin foam, or the like, a sinter of said plastic bead, or the like are used.

In the case where said, a permeable porous material is a fiber sheet, and said fiber sheet is made of a fiber material, for instance, a synthetic fiber such as polyester fiber, core-sheath type polyester fiber, polyethylene fiber, polypropylene fiber, polyamide fiber, acrylic fiber, urethane fiber, polyvinyl chloride fiber, polyvinylidene chloride fiber, acetate fiber, or the like, a natural fiber such as pulp, cotton, palm fiber, hemp fiber, bamboo fiber, kenaf fiber, or the like, an inorganic fiber such as glass fiber, carbon fiber, ceramic fiber, asbestos fiber, or the like, a reclaimed fiber obtained by the defibrating of scraps of the fiber product made of said fiber, or the like, said fiber being used singly or two or more kinds of said fiber may be used in said fiber aggregate, and in a case where the heat resistant synthetic fiber, having a high temperature melting point, preferably higher than 250° C., like an inorganic fiber such as glass fiber, carbon fiber, ceramic fiber, asbestos fiber, stainless fiber, or the like, an aramid fiber such as poly (m-phenylene isophthalamide) fiber, poly (p-phenylene terephthalamide) fiber, or the like, a polyarylate fiber, polyetheretherketone fiber, polyphenylene sulfide, or the like is (are) used, the result is a sound absorbing material, having an extremely high heat resistance, being provided. In said highly heat resistant fiber, carbon fiber is especially useful, since used or scrapped carbon fiber can be treated by incineration, and further, the fragments of the carbon fiber don't fly around, and aramid fiber is also an especially useful fiber, since it is comparatively inexpensive and easily available.

The unit weight of said air-permeable porous material is generally set to be in the range of between 200 $g/m^2$ and 1400 $g/m^2$, preferably between 200 $g/m^2$ and 1000 $g/m^2$. The density of said air-permeable porous material is generally set to be in the range of between 5 $kg/m^3$ and 300 $kg/m^3$, preferably between 10 $kg/m^3$ and 250 $kg/m^3$, and more preferably between 20 $kg/m^3$ and 200 $kg/m^3$. The airflow resistance of said air-permeable porous material is preferably set to be in the range of between 0.1 kPa·s/m and 5 kPa·s/m.

The same thermoplastic resin and/or thermosetting resin as the thermoplastic resin and/or thermosetting resin which is (are) coated on or impregnated in to said stretchable paper material may be coated on or impregnated in to said air-permeable porous material.

In the case where the precondensation polymer of the thermosetting resin such as phenol group resin or the like is coated on a impregnated in to said air-permeable porous material, said air-permeable porous material on (in) to which said precondensation polymer is coated or impregnated is preferably precured so as to put said precondensation polymer in its B-stage, said air-permeable porous material can maintain molding stability for a long time.

The addition of said synthetic resin, especially said thermosetting synthetic resin improves the molded shape maintaining property, and rigidity.

[Surface Skin Material]

As said surface skin material 6 used in the present invention, an air-permeable porous material similar to that used as said first sound absorbing material 4 may be used, and generally nonwoven fabric such as needle punched nonwoven fabric, spun-bonded nonwoven fabric, chemically bonded nonwoven fabric, thermally bonded nonwoven fabric, stitch bonded nonwoven fabric, or the like using the same fiber as used in said air-permeable porous material, or a knit or woven fabric is used as said surface material 6. The unit weight of said surface skin material 6 is generally in the range of between 15 $g/m^2$ and 150 $g/m^2$, but preferably 20 $g/m^2$ and 100 $g/m^2$.

A synthetic resin similar to that which is coated on or impregnated in to said stretchable paper material or air-permeable porous material may be coated on or impregnated in to said surface skin material 6, and if necessary, said surface skin material may be treated with a water-repellant or flame retardant agent.

[Manufacture of Said Surface Material]

To laminate said second sound absorbing layer 5 made of said stretchable paper material and said first sound absorbing layer 4 made of said air-permeable porous material, or to laminate said surface skin material 6 and said second sound absorbing layer 5, a common solution type or aqueous emulsion type adhesive, powdery, cobweb-like, solution type, or aqueous emulsion type hotmelt adhesive or the like may be used. In a case where said powdery or cobweb-like hotmelt adhesive is used as the adhesive, the adhesive layer of said hotmelt adhesive becomes air-permeable, so that said adhesive layer formed by said powdery or cobweb like hotmelt adhesive does not obstruct the air-permeability of the resulting laminated material. In a case where solution type or aqueous emulsion type adhesive is used, if said adhesive is coated in dots by applying spray coating, silk screen printing, offset printing, or the like, the air-permeability of the resulting laminated material may be secured.

The airflow resistance of said surface material 3 is set to be in the range of between 0.4 kPa·s/m and 5 kPa·s/m. In a case where the airflow resistance of said surface material 3 is below 0.4 kPa·s/m, it may be difficult to damp adequately the sound waves radiated into the cell constructed by said porous material 2 through said surface materials. In a case where the airflow resistance of said surface material 3 is beyond 5 kPa·s/m, there may be problems in that sound waves may be reflected by said surface material 3 increasing the noise, or that the thickness of the cell can not be reduced since the sympathetic vibrations of the vibration of said surface material 3 can not be conformed to a low frequency, and so on.

Said surface material 3 is manufactured so that the airflow resistance of said surface material 3 is in the range of between 0.4 kPa·s/m and 5 kPa·s/m. For instance, in a case where the airflow resistance of the laminated material consisting of the first sound absorbing layer 4, said surface material 6 and the second sound absorbing layer 5 is below 0.4 kPa·s/m, the synthetic resin may be coated onto the both sides of said stretchable paper material constructing the second sound absorbing layer 5 so as to adjust the airflow resistance to be higher than 0.4 kPa·s/m. Further, as a means to raise the airflow resistance, aside from the means wherein said synthetic resin is coated onto both sides of said stretchable paper material, the use of fine cobweb-like hotmelt adhesive, the increasing of the density of the first sound absorbing layer 4 or said surface skin material 6, and so on, are illustrated. In a case where the laminated material consisting of the first sound absorbing layer 4, said surface skin layer 6 and the second sound absorbing layer 5 has an airflow resistance of beyond 5 kPa·s/m, many means may be applied to adjust the airflow resistance of said laminated material to be lower than 5 kPa·s/m, such as adjusting the coating amount of the synthetic resin onto said stretchable paper material, the reducing of the density of the first sound absorbing layer 4 or said surface material, or the like.

Accordingly in the manufacturing of said surface material 3, it is not always necessary to control strictly the airflow resistance of each element, the first sound absorbing layer 4, said surface skin layer 6 and the second sound absorbing layer 5 and it is permissible that the airflow resistance of said surface material, wherein the first sound absorbing layer 4, said surface skin layer 6, and the second sound absorbing layer 5 are laminated together, is set to be in the range of between 0.4 kPa·s/m and 5 kPa·s/m.

[Manufacturing of Said Shock and Sound Absorbing Material]

To manufacture said shock and sound absorbing material 1 of the present invention, said surface material 3 manufactured as afore mentioned, is attached onto the surface of said porous component 2 using a tightening means such as a screw, bolt, nut, or the like. In a case where said surface material 3 is attached onto said porous component 2, pedestals 2D, in which holes 2E are formed to insert the tightening means therein, are used.

[Installing of Said Shock and Sound Absorbing Material]

Said shock and sound absorbing material of the present invention is installed onto said cover panel 7, and arranged so as to turn said porous component side to face said cover panel 7, and said surface material side so as to face said sound source, as aforementioned. As said cover panel 7, generally a panel, or a molded article made of a hard plastic such as PS, AS, ABS, AES, PP, modified PP, PVC, PC, PMMA, PSF, PES, PPO, PPS, PAR, PEEK, PAI, PI, PEI, melamine resin, phenol resin, or the like or a foamed panel made of said hard plastic or a woody board such as wooden board, plywood, hard board, particle board, MDF (medium density fiber board), or the like, or a metal panel such as aluminium, iron steel, titanium, or the like, or alloy such as duralumin, stainless steel, or the like, or a molded porous component, said porous component being the same as that used in the present invention, and so on.

To install said shock and sound absorbing material 1 onto said cover panel 7, said surface material 3 is stuck out from the fringe of said porous component 2, and said stuck part is fixed to said cover panel 7 by the tightening means 8, as shown in FIG. 1.

The scope of the present invention should not be limited only by the afore mentioned embodiment. For instance, an open hole 21D may be bored in the bottom of each square tubular blind indentation 21C as shown FIG. 6, or said porous component 22 may be constructed by a corrugated panel in which a large number of open holes 22A are formed, as shown in FIG. 7.

Further, said porous component 23 may be a honey comb like panel, as shown is FIG. 8, or said porous component 24 may be a lattice-like frame as shown in FIG. 9.

To manufacture said porous component 23 made of a honey comb like panel, for instance, the injection molding using a thermoplastic resin may be applied. To manufacture said porous component 24 which is a lattice-like frame, as shown in FIG. 9, for instance, a strip 24A made of a thermoplastic resin, as illustrated above, is cut from one edge of said strip 24A so as to form a plural number of notches 24B, and the plural number of said strips 24A having notches 24B are combined, and one strip 24A is arranged so that said notches 24B face upward and the other strip 24A is arranged so that said notches 24B face downward, and both strips 24A are combined together by engaging said downward notches and upward notches, so as to construct a lattice-like frame, as show in FIG. 10.

Further, in the present invention, a laminated structure, wherein said surface skin material 6 is laminated onto said surface material 3 is not always necessary, and said surface skin layer 6 may be omitted, and in this case, said surface material 3 may be attached onto said porous component 2 so as to turn said stretchable paper material 5 to face said porous component 2, and further, said surface materials 3 are attached onto the both sides of said porous component 2.

EXAMPLES

Examples to illustrate concretely the present invention are described in the following. Nevertheless, the scope of the present invention should not be limited only by EXAMPLES.

Example 1

A: Manufacturing of a Porous Component

A thermoplastic resin mixture containing 70% by mass of a polypropylene, 10% by mass of a low density polyethylene, and 20% by mass of talc was extruded to mold a sheet having a thickness of 0.3 mm, and the resulting sheet was vacuum-formed to mold a porous component 2 having a square shape in plane view as shown in FIG. 2. The resulting porous component 2 had a thickness T of 10 mm, side length L of 45 mm, and the unit weight of 133 g/m$^2$.

B: Manufacturing of the First Sound Absorbing Layer

A fiber web containing 70% by mass of a polyester fiber, and 30% by mass of a core-sheath type composite polyester fiber having a low melting point (melting point: 150° C.), said fiber web having a unit weight of 500 g/m$^2$ was heated by a hot roll, and then cooled so as to manufacture the first sound absorbing layer made of an air-permeable porous material.

The resulting first sound absorbing layer had a thickness of 5 mm, a density of 100 kg/m$^3$, and an airflow resistance of 0.45 kPa·s/m.

C: Manufacturing of the Second Sound Absorbing Layer and the Surface Skin material Forty parts by mass of a sulfomethylated phenol-alkylresorcin-folmaldehyde precondensation polymer (Solid content 45% by mass, water solution), 2 parts by mass of a fluorine group water and oil repellent agent (Solid content: 20% by mass, water solution), 1 part by mass of a carbon black (Solid content: 20% by mass, water dispersion), and 57 parts by mass of water were mixed to prepare a mixture solution. Said mixture solution was then impregnated into a fiber sheet which was a needle punched nonwoven fabric made of a polyester fiber having a unit weight of 70 g/m$^2$, to adjust the impregnating amount to be 10 g·m$^2$, as a solid. The resulting fiber sheet, into which said mixture solution was impregnated, was then dried at 150° C. for 2 minutes to precure said precondensation polymer in said mixture solution, and to obtain a surface skin material.

A cobweb-like hotmelt adhesive sheet (melting point: 135° C., unit weight: 10 g/m$^2$) was then put onto the backside of said surface skin material, and further, a creped paper as a stretchable paper material, containing 70% by mass of a conifer pulp and, 30% by mass of a broad-leaved tree pulp (unit weight: 20 g/m$^2$, creping degree: 30%, airflow resistance 0.16 kPa·s/m) was put onto said cobweb-like hotmelt adhesive sheet so as to adhere said stretchable paper material to said surface skin material, through said hotmelt adhesive sheet.

Following this, an acrylic ester emulsion was then coated onto said stretchable paper material in a coating amount of 20 g/m$^2$, using a roll coater, after which said laminated material of said surface skin material, and said stretchable paper material were suction-dried at 120° C. for 2 minutes to obtain a second sound absorbing layer consisting of said surface skin layer onto which said stretchable paper material was laminated.

D: Manufacturing of Said Surface Material

Said first sound absorbing layer manufactured in B, and said second sound absorbing layer and said surface skin material manufactured in C, were laminated through said cobweb-like hotmelt adhesive sheet (melting point: 135° C., unit weight: 10 g/m$^2$) used in C, after which the resulting laminated material was then pressed by a hot roll to obtain a surface material.

The resulting surface material had a thickness of 6 mm, and an airflow resistance of 0.98 kPa·s/m.

E: Manufacturing of Said Shock and Sound Absorbing Material

By using said surface material 3 manufactured in D, and said porous material 2 manufactured in A, a shock and sound absorbing material 1 shown in FIG. 1 was manufactured.

The resulting shock and sound absorbing material was attached onto a base panel (7) manufactured by the injection molding of a polypropylene, and having a thickness of 1 mm, and a unit weight of 1690 kg/m$^2$.

[Comparison 1]
C: Manufacturing of the Surface Skin Layer

In EXAMPLE 1, only said surface skin material was used instead of the second sound absorbing layer, wherein said stretchable paper material onto which said acrylic ester emulsion was coated, was laminated onto said surface skin layer.

A shock and sound absorbing material sample was manufactured in the same way as EXAMPLE 1, with the exception that said surface skin layer in C was attached onto the first sound absorbing layer in EXAMPLE 1, B.

The resulting surface material had a thickness of 6 mm and an airflow resistance of 0.49 kPa·s/m. Further, said cobweb-like hotmelt adhesive sheet used in EXAMPLE 1, C was used to adhere said surface skin layer to first sound absorbing layer.
[Comparison 2]
B: Manufacturing of the First Sound Absorbing Layer.

The first sound absorbing layer was manufactured in the same way as in EXAMPLE 1, with the exception that the unit weight of the first sound absorbing layer in B was set to be 1200 g/m$^2$.

The first sound absorbing layer had a thickness of 5 mm, a density of 240 kg/m$^3$, an air flow resistance of 0.92 kPa·s/m.

A shock and sound absorbing material sample was manufactured in the same way as in EXAMPLE 1, with the exception that said surface skin material used in COMPARISON 1, C was attached onto the first sound absorbing layer in B to prepare a surface material.

The resulting surface material had a thickness of 6 mm, and an airflow resistance of 0.99 kPa·s/m. Further, the same cobweb-like hotmelt adhesive sheet as used in C was used to adhere said surface skin material to the first sound absorbing layer.
[Comparison 3]
B: Manufacturing of the First Sound Absorbing Layer The first sound absorbing layer was prepared in the same way as applied in COMPARISON 2, with the exception that the unit weight of the first sound absorbing layer B was set to be 800 g/m$^2$.

The resulting first sound absorbing layer had a thickness of 10 mm, a density of 80 kg/m$^3$, an airflow resistance of 0.37 kPa·s/m.

A shock and sound absorbing material sample was manufactured in the same way as applied in COMPARISON 2 with the exception that said first sound absorbing layer having a unit weight of 800 g/m² was used.

The resulting surface material had a thickness of 11 mm and an airflow resistance of 0.41 kPa·s/m.

[Comparison 4]

A shock and sound absorbing material sample was manufactured in the same way as applied in EXAMPLE 1 with the exception that the first sound absorbing layer in B was eliminated, and said surface skin material in C and the second sound absorbing layer were used as the surface layer.

The resulting surface material had a thickness of 1 mm and an airflow resistance of 0.37 kPa·s/m.

[Comparison 5]

F: Manufacturing of the Sound Absorbing Material Sample.

A fiber web consisting of 70% by mass of a polyester fiber, and 30% by mass of a core-sheath type composite polyester fiber, having a low melting point (melting point: 150° C.), said fiber web having a unit weight of 1500 g/m², was heated by a hot roll, and then cooled to obtain a sound absorbing material made of an air-permeable porous material.

The resulting sound absorbing material sample had a thickness of 10 min, a density of 150 kg/m³, and an airflow resistance of 1.01 kPa·s/m.

Said sound absorbing material sample was attached onto the same base panel (7) as used in EXAMPLE 1 as the shock and sound absorbing material.

[Test Result]

The weight and airflow resistance of each shock and sound absorbing material sample manufactured in EXAMPLE 1, and COMPARISONS 1 to 5 were each measured. The results are shown in Table 1.

The total weight of each shock and sound absorbing material sample being measured was the total dry weight of said surface material, porous component and others such as adhesives, synthetic resins, and the like used in said shock and sound absorbing material. However, said sound absorbing material prepared in COMPARISON 5 was made only of the air-permeable porous material as aforementioned.

Regarding airflow resistance, the airflow resistance of said surface material without said porous component was measured.

TABLE 1

| | EXAMPLE 1 | COMPARISON 1 | COMPARISON 2 | COMPARISON 3 | COMPARISON 4 | COMPARISON 5 |
|---|---|---|---|---|---|---|
| Weight (g/m²) | 773 | 723 | 1423 | 1023 | 163 | 150 |
| Airflow resistance (kPa · s/m) | 0.98 | 0.49 | 0.99 | 0.41 | 0.57 | 1.01 |

A reverberation room method sound absorbance regarding each shock and sound absorbing material sample in EXAMPLE 1 and COMPARISONS 1 to 5 was measured.

The results are shown in Table 2 and FIG. 11.

Herein the measurements were performed, conforming to the measurement method provided in JIS A 1409 Reverberation room method sound absorbance.

TABLE 2

| Center frequency (Hz) | Reverberation room method sound absorbance(%) | | | | | |
|---|---|---|---|---|---|---|
| | EXAMPLE 1 | COMPARISON 1 | COMPARISON 2 | COMPARISON 3 | COMPARISON 4 | COMPARISON 5 |
| 160 | 35 | 17 | 32 | 30 | 5 | 29 |
| 200 | 40 | 17 | 35 | 36 | 7 | 30 |
| 250 | 55 | 22 | 42 | 42 | 7 | 47 |
| 315 | 53 | 25 | 45 | 45 | 6 | 48 |
| 400 | 59 | 30 | 43 | 43 | 10 | 53 |
| 500 | 72 | 40 | 50 | 50 | 11 | 62 |
| 630 | 85 | 47 | 67 | 67 | 19 | 77 |
| 800 | 87 | 50 | 75 | 75 | 18 | 85 |
| 1000 | 93 | 53 | 77 | 77 | 17 | 84 |
| 1250 | 96 | 55 | 85 | 85 | 25 | 87 |
| 1600 | 95 | 57 | 85 | 85 | 22 | 83 |
| 2000 | 95 | 60 | 90 | 90 | 38 | 80 |
| 2500 | 94 | 64 | 87 | 87 | 42 | 83 |
| 3150 | 95 | 66 | 82 | 82 | 39 | 77 |
| 4000 | 93 | 65 | 85 | 84 | 30 | 75 |
| 5000 | 92 | 66 | 82 | 82 | 35 | 75 |
| 6300 | 97 | 64 | 84 | 84 | 32 | 77 |

Referring to Table 1, Table 2 and FIG. 11, it is confirmed that said shock and sound absorbing material sample of EXAMPLE 1 has a light weight and an excellent sound absorbing performance.

The sample of COMPARISON 1, in which the second sound absorbing layer (creped paper) was omitted, said sample corresponding to the conventional shock and sound absorbing material, had a smaller surface material airflow resistance and inferior sound absorbing performance, as compared to those of the sample of EXAMPLE 1.

The sample of COMPARISON 2, having a larger unit weight as compared to that of the sample of COMPARISON 1, had an improved sound absorbing performance as compared to that of the sample of COMPARISON 1, but an inferior sound absorbing performance as compared to that of the sample of EXAMPLE 1, it being confirmed that the sample of COMPARISON 2 was twice as heavy as the sample of EXAMPLE 1.

The sample of COMPARISON 3, having a greater thickness than that of the sample of COMPARISON 1, had an improved sound absorbing performance as compared to that of the COMPARISON 1, but an inferior sound absorbing performance as compared to that of the sample of EXAMPLE 1, and it is confirmed that its weight increased.

IT is confirmed that the sample of COMPARISON 4, in which the first sound absorbing layer was omitted, had a remarkably inferior sound absorbing performance as compared to that of the sample of EXAMPLE 1.

It is confirmed that the unit weight should be increased so as to improve the sound absorbing performance in the sample of COMPARISON 5, which consisted only of said air-permeable porous material.

Example 2

A: Thermoplastic resin mixture consisting of 70% by mass of a polypropylene, 10% by mass of a low density polyethylene, and 20% by mass of talc, was extruded so as to mold a sheet having a thickness of 0.3 mm, and the resulting sheet was then molded by vacuum-forming, to obtain a porous component 21 shown, in FIG. 6.

The resulting porous component 21 had a thickness T of 5 mm and a side length L of 20 mm.

B: Manufacturing of the First Sound Absorbing Layer

A web consisting of 60% by mass of a kenaf fiber, 30% by mass of a polypropylene, and 10% by mass of a polyester fiber, and having a unit weight of 500 g/m$^2$, was heated by a hot roll, and then cooled, so as to obtain the first sound absorbing layer made of an air-permeable porous material.

The resulting first sound absorbing layer had a thickness of 3 mm, a density of 167 kg/m$^3$, and an airflow resistance of 0.32 kPa·s/m.

C: Manufacturing of the Second Sound Absorbing Layer and the Surface Skin Layer

A needle punched fiber sheet made of a polyester fiber and having a unit weight of 80 g/m$^2$ was used as a surface skin material.

A hotmelt adhesive powder (melting point: 125° C., particle size: 200 μm) made of a polyamide copolymer was coated onto the back side of said surface skin material by scattering method, so that the coating amount of said hotmelt adhesive powder was to be 5 g/m$^2$.

Further, a creped paper consisting of 70% by mass of a conifer wood pulp and 30% by mass of a broad-leaved tree wood pulp (unit weight: 20 g/m$^2$, creping degree: 40%, airflow resistance: 0.63 kPa·s/m) was put onto said hotmelt adhesive coating layer as an stretchable paper material, after which the resulting laminated material was heated by a hot roll at 130° C., then, cooled, so as to adhere said stretchable paper material onto said surface skin material, and thus, the second sound absorbing layer being a laminated material of said surface skin layer and said stretchable paper material was obtained.

D: Manufacturing of Said Surface Material

The first sound absorbing layer prepared in B, and the second sound absorbing layer, and said surface skin material prepared in C were laminated through a cobweb-like hotmelt adhesive sheet (melting point: 125° C., unit weight: 5 g/m$^2$) and then the resulting laminated material was heated by a hot roll, to adhere them together, and obtain a surface material.

The resulting surface material had a thickness of 3 mm and an airflow resistance of 1.12 kPa·s/m:

E: Manufacturing of the Shock and Sound Absorbing Material

Said surface material prepared in D was installed onto said porous component 2 prepared in A, using tightening tools, so as to manufacture a shock and sound absorbing material.

The resulting shock and sound absorbing material was useful as a shock and sound absorbing material which can be applied to a door trim, the upper or lower surface of a floor, a trunk room trim, fender liner, or the like, of a car.

Example 3

A: Manufacturing of Said Porous Component

A polymer alloy consisting of 50% by mass of a modified polyphenylene ether, 45% by mass of 66 nylon, and 5% by mass of a styrene-hydrogenerated polyolefine-styrene block copolymer was extruded to mold a sheet having a thickness of 0.6 mm and the resulting polymer alloy sheet was molded by vacuum and pressure forming, so as to obtain a porous component 2, shown in FIG. 1.

The resulting porous component had a thickness T of 80 mm, and a side length L of 50 min.

B: Manufacturing of the First, Sound Absorbing Layer

A fiber web consisting of 10% by mass of a regenerated carbon fiber, 60% by mass of a glass fiber, and 30% by mass of a core-sheath type composite polyester fiber having a low melting point (melting point 150° C.), said fiber web having a unit weight of 800 g/m$^2$, was heated, and then cooled so as to obtain the first sound absorbing layer made of said air-permeable porous material.

The resulting first sound absorbing layer had a thickness of 30 mm, a density of 26.6 kg/m$^3$, and an airflow resistance of 0.22 kPa·s/m.

C: Manufacturing of the Second Sound Absorbing Layer and Said Surface Skin Layer A spun-bonded fiber sheet, made of a polyester fiber, having a unit weight of 50 g/m$^2$, was used as a surface skin layer.

A hotmelt adhesive powder, made of a polyamide copolymer (melting point: 135° C., particle size: 200 μm), was coated onto the backside of said surface skin layer by scattering method in a coating amount of 5 g/m$^2$.

Further, an embossed paper consisting of 70% by mass of a conifer wood pulp, and 30% by mass of a broad leaved tree wood pulp (unit weight: 20 g/m$^2$, the height of projection: 0.2 mm, the number of projections 64 projections/cm$^2$, airflow resistance: 0.47 kPa·s/m) was used as an stretchable paper material, and said stretchable paper material was then put onto said hotmelt adhesive coating layer, and the resulting laminated material was heated by a hot roll at 140° C. and cooled so as to adhere said stretchable paper material to said surface skin material.

A mixture solution containing 40 parts by mass of a sulfimethylated phenol alkylresorcin-formaldehyde precondensation copolymer (solid content: 45% by mass, water solution), 2 parts by mass of a fluorine group water and oil repellant agent, 1 part by mass of a carbon black dispersion (solid content 20% by mass, water dispersion), and 57 parts by mass of water, was prepared. The resulting mixture solution was then coated on and impregnated in to said laminated material of said surface skin layer and said stretchable paper material in a coating amount to be 20 g/m$^2$, and then said laminated material into which said mixture solution was impregnated was then dried at 150° C. for 2 minutes to precure said precondensation copolymer in said solution mixture impregnated into said laminated material, so as to obtain the laminated material of the second sound absorbing layer and said surface skin layers.

D: Manufacturing of Said Surface Material

The first sound absorbing layer prepared in B, said laminated material of the second sound absorbing layer and said surface skin layer prepared in C, were laminated together, and then the resulting laminated material was hot pressed at 180° C., to obtain a surface material.

The resulting surface material had a thickness of 30 mm and an airflow resistance of 0.78 kPa·s/m.

E: Manufacturing of Said Shock and Sound Absorbing Material

Said surface material 3 prepared in D and said porous component 2 prepared in A were installed onto an aluminum base panel, to obtain a shock and sound absorbing material 1, as shown in FIG. 1.

The resulting shock and sound absorbing material had an excellent heat and weather resistance, and is useful for air-conditioning equipment, a wall surface, the underside of an elevated road, or the like.

Possibility of Industrial Use

Said shock and sound absorbing material of the present invention has a light weight, and an excellent shock and sound absorbing property, so that said shock and sound absorbing material is extremely useful as an interior finishing material for a car, or the like. Accordingly said shock and sound absorbing material of the resent invention can be industrially used.

Figure 1:
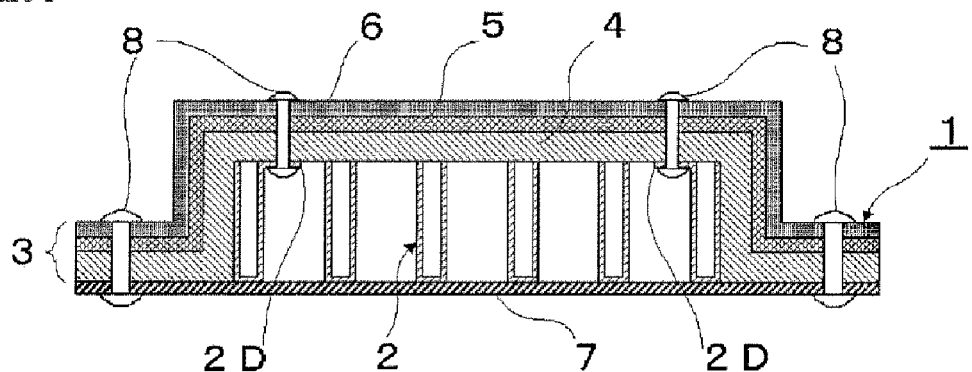
FIG. 1 is a sectional view of a sound absorbing material fitted to a cover panel.
Figure 2:
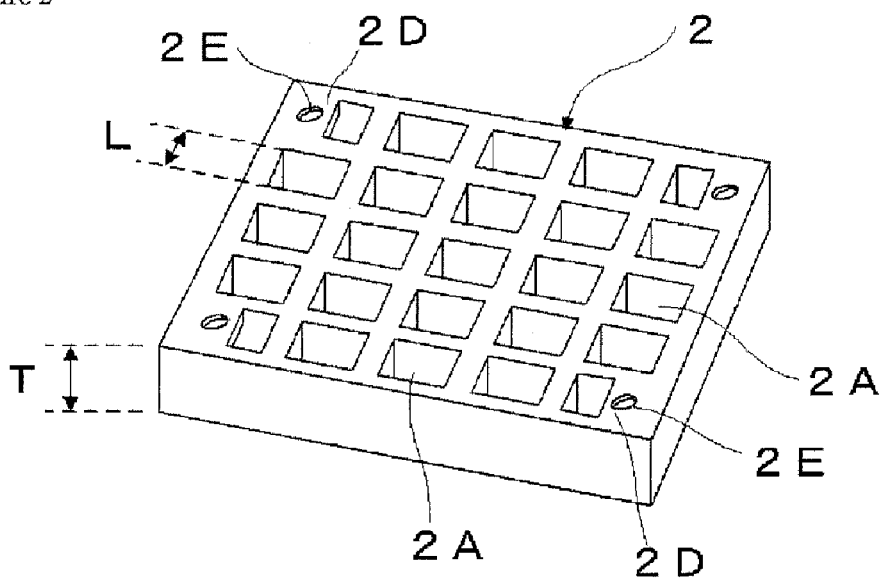
FIG. 2 is a perspective view of a porous material.
Figure 3:
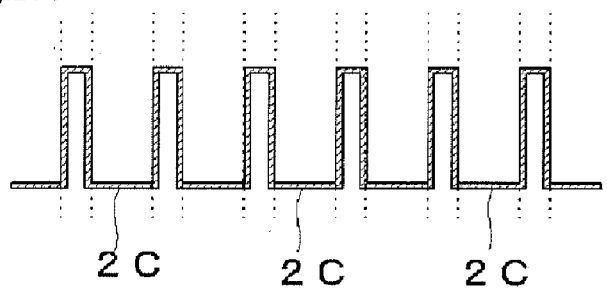
FIG. 3 is a sectional view of a porous material.
Figure 4:
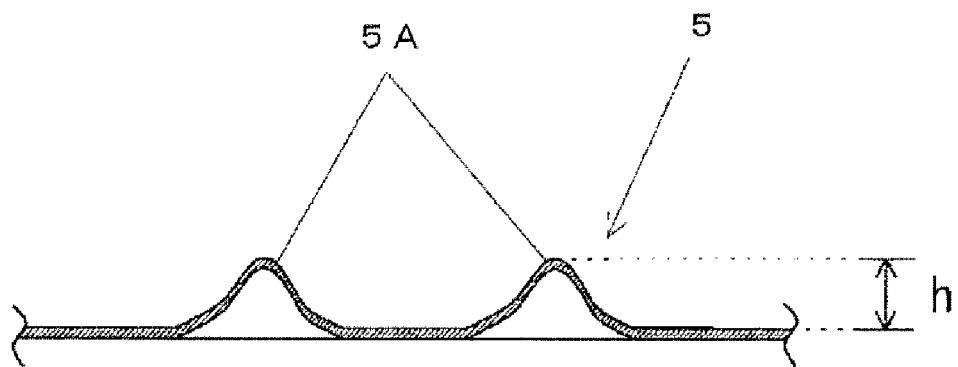
FIG. 4 is a sectional view of the height of a projection on an embossed paper.
Figure 5:
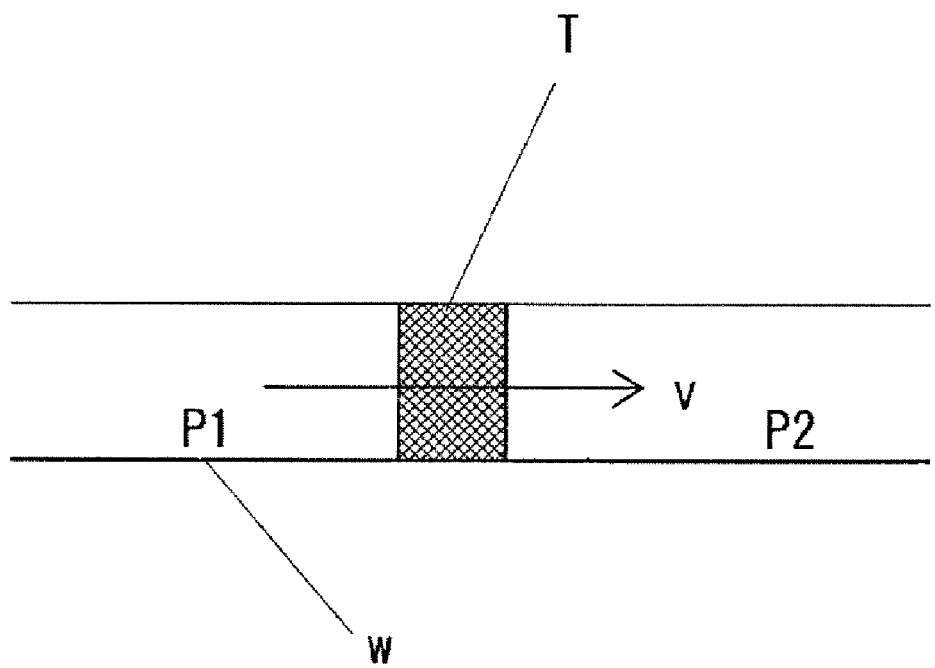
FIG. 5 is a schematic view illustrating a method for the measuring of airflow resistance.
Figure 6:
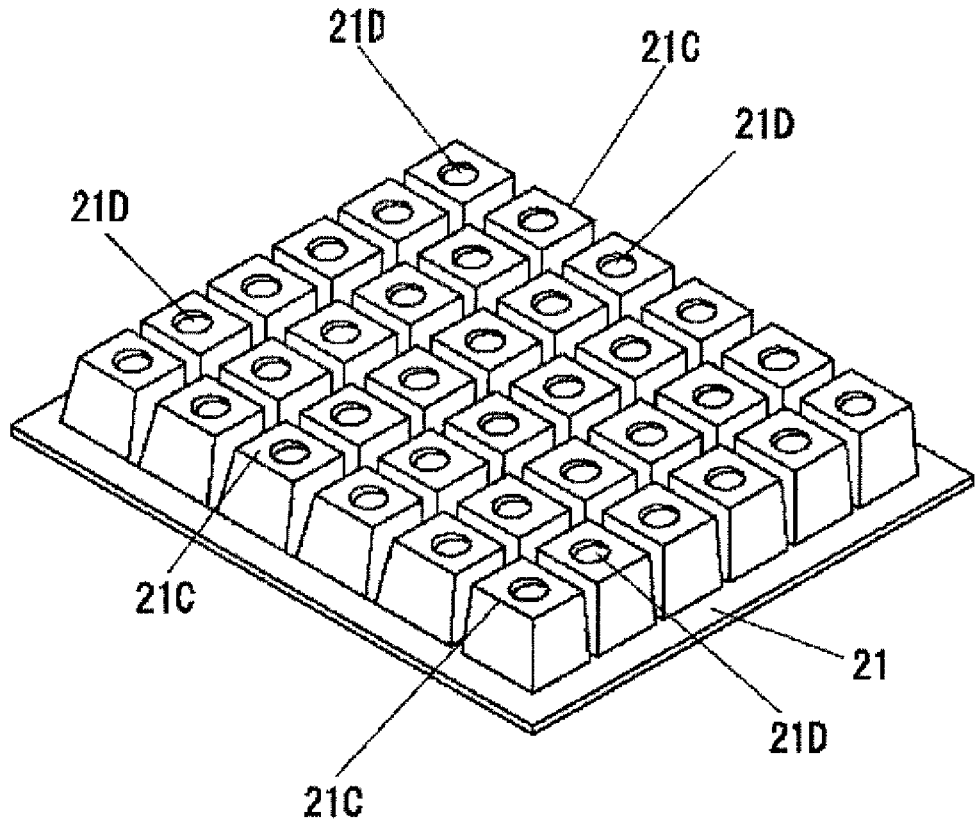
FIG. 6 is a perspective view of a porous material having open holes.
Figure 7:
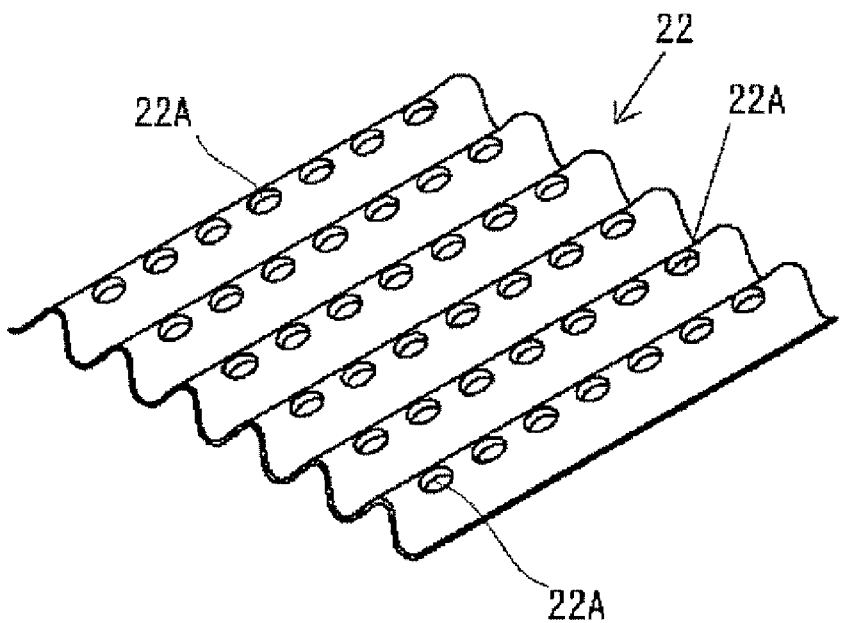
FIG. 7 is a perspective view of a corrugated porous material.
Figure 8:
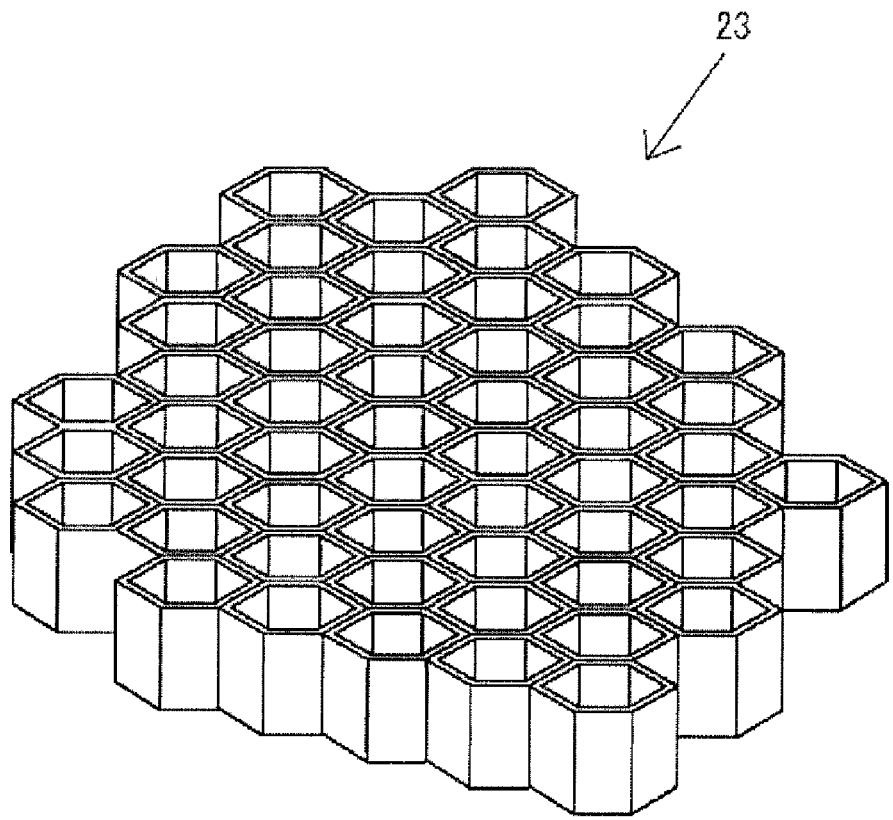
FIG. 8 is a perspective view of a honeycomb-like porous material.
Figure 9:
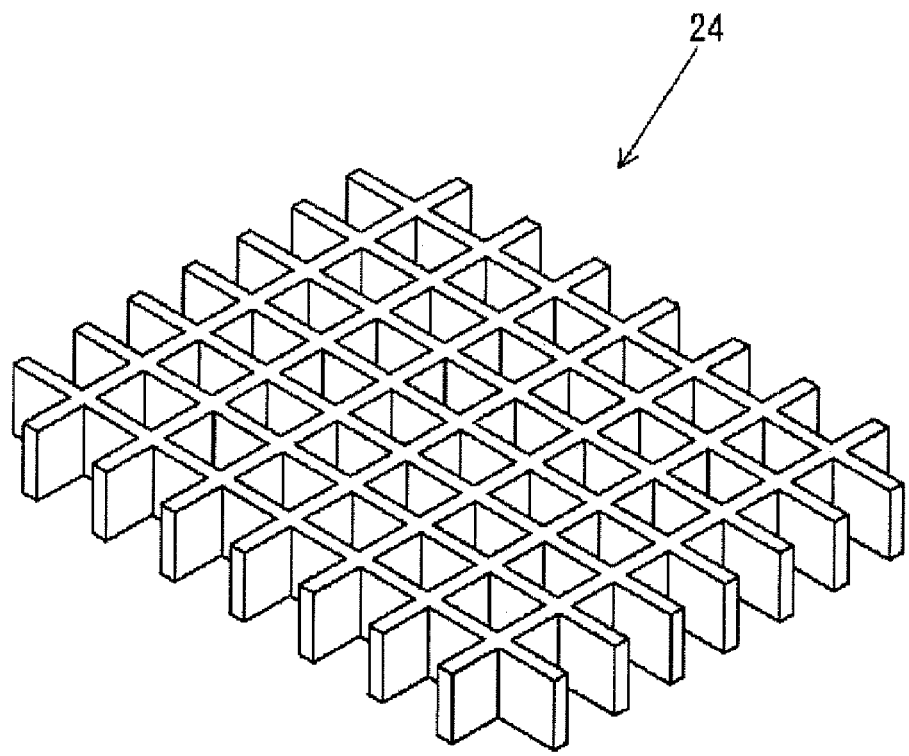
FIG. 9 is a perspective view of a lattice-like porous material.
Figure 10:
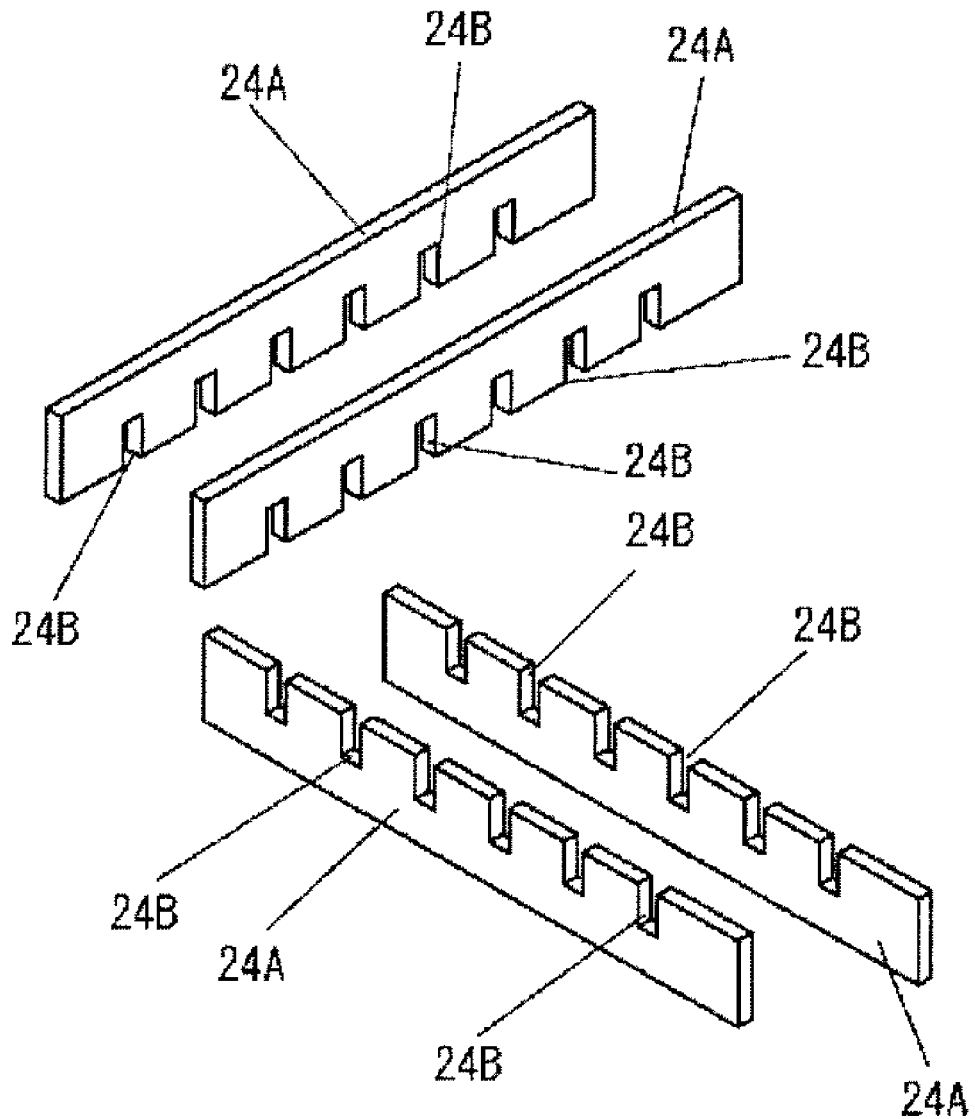
FIG. 10 is a perspective view of the assembling of porous materials.
Figure 11:
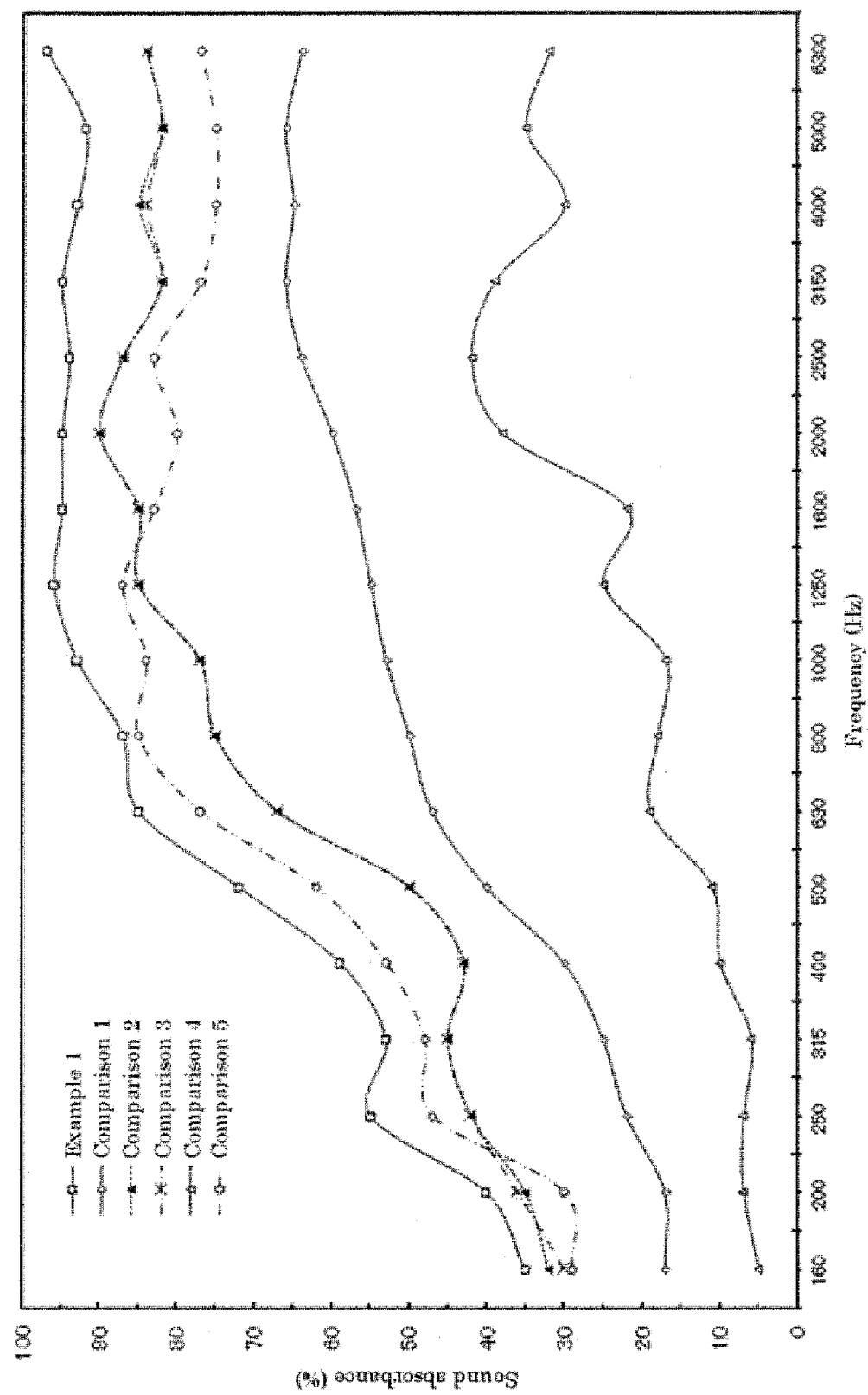
FIG. 11 is a graph illustrating each degree of sound absorption corresponding to each frequency in Examples and Comparisons.

| EXPLANATION OF CODES | |
|---|---|
| 1. | Shock and sound absorbing material |
| 2, 21, 22, 23, 24 | Porous material |
| 3. | Surface material |
| 4. | Air-permeable porous component |
| 5. | Stretchable paper material |
| 6. | Surface skin material |
| 7. | Cover panel |

The invention claimed is:

1. A shock and sound absorbing material, comprising a porous component having a plural number of tubular open cells and a surface material which is laminated onto said porous component, wherein said surface material includes at least a first sound absorbing layer arranged on said porous component, a second sound absorbing layer laminated onto said first sound absorbing layer, and a surface skin layer, laminated onto said second sound absorbing layer, with said second sound absorbing layer being made of a stretchable paper material which is selected from the group consisting of creped paper, embossed paper, and creped and embossed paper wherein fine wrinkles are formed on the surface of said creped paper or said creped and embossed paper and a large number of projections are formed on said embossed paper or said creped and embossed paper and each of said creped paper, said embossed paper or said creped and embossed paper has a unit weight in the range of between 10 and 50 g/m$^2$, and an airflow resistance of between 0.06 and 3.0 kPa·s/m, so as to adjust an air flow resistance of said surface material between 0.4 and 5.0 kPa·s/m.

2. A shock and sound absorbing material in accordance with claim 1, wherein said first sound-absorbing layer and said surface skin layer are made of an air-permeable porous material.

3. A shock and sound absorbing material in accordance with claim 1, wherein said porous component is a panel component made from a thermoplastic resin, having a large number of apertures which form a wall structure.

4. A shock and sound absorbing material in accordance with claim 1, wherein a synthetic resin is coated onto at least one of the surface and the backside of said stretchable paper material, so as to adjust the airflow resistance of said stretchable paper material.

5. A sound absorbing structure, wherein said shock and sound absorbing material in accordance with claim 1 is installed on a cover panel covering a sound source, with said shock and sound absorbing material being arranged so that said surface material faces said sound source, and said porous component faces said cover panel.

* * * * *